US010791341B2

(12) United States Patent
Said et al.

(10) Patent No.: US 10,791,341 B2
(45) Date of Patent: Sep. 29, 2020

(54) BINARY ARITHMETIC CODING WITH PROGRESSIVE MODIFICATION OF ADAPTATION PARAMETERS

(71) Applicant: QUALCOMM Incorporated, San Diego, CA (US)

(72) Inventors: Amir Said, San Diego, CA (US); Hilmi Enes Egilmez, San Diego, CA (US); Marta Karczewicz, San Diego, CA (US); Vadim Seregin, San Diego, CA (US); Li Zhang, San Diego, CA (US); Xin Zhao, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/155,708

(22) Filed: Oct. 9, 2018

(65) Prior Publication Data

US 2019/0110080 A1    Apr. 11, 2019

Related U.S. Application Data

(60) Provisional application No. 62/570,560, filed on Oct. 10, 2017.

(51) Int. Cl.
*H04N 19/70* (2014.01)
*H04N 19/184* (2014.01)
(Continued)

(52) U.S. Cl.
CPC ............. *H04N 19/70* (2014.11); *H04N 19/13* (2014.11); *H04N 19/184* (2014.11);
(Continued)

(58) Field of Classification Search
CPC ...... H04N 19/70; H04N 19/184; H04N 19/44; H04N 19/463; H04N 19/13; H04N 19/91
(Continued)

(56) References Cited

U.S. PATENT DOCUMENTS 7,991,237 B2 * 8/2011 Sekiguchi ............ H04N 19/176
382/164
2012/0014433 A1 * 1/2012 Karczewicz .......... H04N 19/13
375/240.02
(Continued)

FOREIGN PATENT DOCUMENTS

WO    2016196287 A1    12/2016

OTHER PUBLICATIONS

Alshin A., et al., "Multi-Parameter Probability Up-Date for CABAC," 6, JCT-VC Meeting, 97, MPEG Meeting, Jul. 14, 2011-Jul. 22, 2011, Torino, (Joint Collaborative Team on Video Coding of ISO/IEC JTC1/SC29/WG11 and ITU-T SG.16); URL: HTTP://WFTP3.1TU.INT/AV-ARCH/JCTVC-SITE/, no. JCTVC-F254, Jul. 2, 2011 (Jul. 2, 2011), pp. 1-5, XP030009277.
(Continued)

*Primary Examiner* — Tung T Vo
(74) *Attorney, Agent, or Firm* — Shumaker & Sieffert, P.A.

(57) ABSTRACT

A video decoder can be configured to generate a first bin stream by, for at least one bin of the first bin stream, determining a first probability estimation for the at least one bin of the first bin stream based on a first set of parameters and generate a second bin stream by, for at least one bin of the second bin stream, determining a second probability estimation for the at least one bin of the second bin stream based on a second set of parameters that are different parameters than the first set of parameters.

18 Claims, 19 Drawing Sheets

(51) Int. Cl.
H04N 19/44 (2014.01)
H04N 19/463 (2014.01)
H04N 19/91 (2014.01)
H04N 19/13 (2014.01)

(52) U.S. Cl.
CPC .......... *H04N 19/44* (2014.11); *H04N 19/463* (2014.11); *H04N 19/91* (2014.11)

(58) Field of Classification Search
USPC .................................................. 375/240.15
See application file for complete search history.

(56) References Cited

U.S. PATENT DOCUMENTS

| | | | |
|---|---|---|---|
| 2012/0300926 A1* | 11/2012 | Zou | H04N 21/8358 380/210 |
| 2013/0027230 A1* | 1/2013 | Marpe | H04N 19/436 341/107 |
| 2013/0230097 A1 | 9/2013 | Sole et al. | |
| 2014/0140400 A1* | 5/2014 | George | H04N 19/70 375/240.12 |
| 2014/0177708 A1 | 6/2014 | Alshin et al. | |
| 2018/0278946 A1 | 9/2018 | Said et al. | |

OTHER PUBLICATIONS

Ailshin et al., "High precision probability estimation for CABAC," In Proc. IEEE Visual Commun. Image Process, Conf. Kuching, Malyasia, Nov. 2013, 6 pp.

Belyaev E., et al., "Binary Arithmetic Coding System with Adaptive Probability Estimation by Virtual Sliding Window," 2006 IEEE Tenth International Symposium, IEEE, Jun. 28, 2006 (Jun. 28, 2006), pp. 1-5, XP010936892, DOI: 10.1109/ISCE.2006.1689517, ISBN: 978-1-4244-0216-8.

Chen et al., "Algorithm Description of Joint Exploration Test Model 5 (JEM 5)" Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 Pages.

Chen J., et al., "Further Improvements to HMKTA-1.0," 52. VCEG meeting, Jun. 19, 2015-Jun. 26, 2015, Warsaw, (Video Coding Experts Group of ITU-T SG.16), no. VCEG-AZ07, Jun. 19, 2015 (Jun. 19, 2015), XP030003885, 8 pp.

Cui J., et al., "An Optimized Probability Estimation Model for Binary Arithmetic Coding," 2015 Visual Communications and Image Processing (VCIP), IEEE, Dec. 13, 2015 (Dec. 13, 2015), XP032894078, pp. 1-4.

Howard et al., "Practical Implementations of Arithmetic Coding," Image and Text Compression, J.A. Storer, Ed., Chapter 4, Kluwer Academic Publishers, Norwell, MA, Jan. 1992, pp. 85-112.

International Search Report and Written Opinion—PCT/US2018/055214—ISA/EPO—Jan. 28, 2019 16 pp.

"ITU-T H.265, Series H: Audiovisual and Multimedia Systems, Infrastructure of audiovisual services- Coding of moving video, High efficiency video coding," The International Telecommunication Union, Apr. 2015, 634 pp.

Leighton et al., "Estimating a Probability Using Finite Memory," IEEE Transactions on Information Theory, vol. 32, No. 6, Nov. 1986, pp. 733-742.

Marpe D., et al., "Context-Based Adaptive Binary Arithmetic Coding in the H.264/AVC Video Compression Standard," IEEE Transactions on Circuits and Systems for Video Technology, vol. 13, No. 7, Jul. 1, 2003, pp. 620-636, XP055120073, ISSN: 1051-8215, DOI: 10.1109/TCSVT.2003.815173.

Meron et al., "Finite-Memory Universal Prediction of Individual Sequences," IEEE Transactions on Information Theory, vol. 50, No. 7, Jul. 2004, pp. 1506-1523.

Mitra, "Digital Signal Processing: A Computer-based Approach," Chapter 8: "Digital Filter Structures," McGraw-Hill Publishing Co, New York, NY, 4th Ed., Sep. 10, 2010, pp. 417-488.

Mukherjee et al. "The latest open-source video codec VP9- an overview and preliminary results," in Proc. 30th Picture Coding Symp., San Jose, CA, Dec. 2013, 4 pp.

Oppenheim et al., "Discrete-Time Signal Processing," Chapter 6: "Structures for Discrete-Time Systems," Prentice-Hall, Inc., Saddle River, NJ, 3rd Edition, Aug. 2009, 122 pp.

Pennebaker et al., "Probability Estimation for the Q-Coder," International Business Machines Corporation, IBM J. Res. Develop. vol. 32, No. 6, Nov. 1988, pp. 737-752.

Richardson, "The H.264 Advanced Video Compression Standard," Second Edition, John Wiley and Sons, Ltd, Aug. 9, 2010, 337 pp.

Said A., "Arithmetic Coding," Lossless Compression Handbook, K. Sayood, Ed., Academic Press, Chapter 5, Dec. 18, 2003, pp. 101-152.

Said A., et al., "Arithmetic Coding with Context-Dependent Double-Window Adaptation Response," 7. JVET Meeting, 13-7-2017-21-7-2017, Torino, (The Joint Video Exploration Team of ISO/IEC JTC1/SC29/WG11 and ITU-T SG.16); URL:HTTP://PHENIX.INT-EVRY.FR/JVET/, No. JVET-G0112-v2, Jul. 14, 2019 (Jul. 14, 2017), XP030150916, pp. 1-4.

Said et al., "EE2 related: Arithmetic Coding with Progressive Context-Dependent Double-Window Adaptation Response," 8. JVET Meeting; Oct. 18-24, 2017, MACAU; (The Joint Video Exploration Team of 180/IEC JTC1/SC29/WG11 and ITU-T SG.16), JVET-H0067, pp. 1-9.

Said, "Introduction to Arithmetic Coding- Theory and Practice," Hewlett Packard Laboratories, Technical Report HPL-2004-76, Apr. 2004, 67 pp.

Stegemann J., et al., "Counter-Based Probability Model Update with Adapted Arithmetic Coding Engine," 7. JCT-VC Meeting, 98, MPEG Meeting, Nov. 21, 2011-Nov. 30, 2011, Geneva, (Joint Collaborative Team on Video Coding of ISO/IEC JTC1/SC29/WG11 and ITU-T SG.16 URL: HTTP://WFTP3.ITU.INT/AV-ARCH/JCTVC-SITE/, No. JCTVC-G547, Nov. 8, 2011 (Nov. 8, 2011), XP030110531, pp. 1-4.

Sze V., et al., "High Efficiency Video Coding (HEVC) : Algorithms and Architectures—Chapter 8: Entropy Coding in HEVC," In: "High Efficiency Video Coding (HEVC) : Algorithms and Architectures—Chapter 8: Entropy Coding in HEVC," Jan. 1, 2014 (Jan. 1, 2014), Springer International Publishing, XP55263413, ISBN: 978-3-319-06894-7 pp. 209-269.

Sze et al., "High Throughput CABAC Entropy Coding in HEVC," IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.

Nien, "High Efficiency Video Coding," Coding Tools and Specification, Springer-Verlag, 2015 (Applicant points out, in accordance with MPEP 609.04(a), that the year of publication, 2015, is sufficiently earlier than the effective U.S. filing date, so that the particular month of publication is not in issue.), 30 pp.

Witten et al., "Arithmetic Coding for Data Compression," Communications of the ACM, vol. 30, No. 6, Jun. 1987, pp. 520-540.

Said et al., "EE2: Arithmetic Coding with Context-Dependent Double-Window Adaptation Response," 8. JVET.Meeting; Oct. 18-24, 2017, MACAU; (The Joint Video Exploration Team (JVET) of ITU-T SG 16 WP3 and ISO/IEC JTC 1/SC 29/WG11), JVET-H0061, pp. 1-9.

Alsiaina et al., "Description of Exploration Experiments on Coding Tools," 7th JVET Meeting; Jul. 13-21, 2017, (The Joint Video Exploration Team (JVET) of ITU-T SG 16 WP3 and ISO/IEC JTC 1/SC 29/WG11), JVET-G1011, pp. 1-8.

Suehring et al., "JVET common test conditions and software reference configurations," 7th JVET Meeting; Jul. 13-21, 2017, (The Joint Video Exploration Team (JVET) of ITU-T SG 16 WP3 and ISO/IEC JTC 1/SC 29/WG11), JVET-G1010, pp. 1-4.

* cited by examiner

BINARY ARITHMETIC CODING WITH PROGRESSIVE MODIFICATION OF ADAPTATION PARAMETERS

This Application claims the benefit of U.S. Provisional Patent Application 62/570,560 filed 10 Oct. 2017, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to binary arithmetic coding with progressive modification of adaptation parameters.

According to one example, a method includes determining a first decoded syntax element by applying binary arithmetic decoding to an encoded version of the first syntax element included in a bitstream of the video data, wherein applying the binary arithmetic decoding to the encoded version of the first syntax element comprises: generating a first bin stream, wherein generating the first bin stream comprises determining a first probability estimation for at least one bin of the first bin stream based on a first set of parameters; debinarizing the first bin stream to form the first decoded syntax element; determining a second decoded syntax element by applying the binary arithmetic decoding to an encoded version of the second syntax element included in the bitstream of the video data, wherein applying the binary arithmetic decoding to the encoded version of the second syntax element comprises: generating a second bin stream, wherein generating the second bin stream comprises determining a second probability estimation for at least one bin of the second bin stream based on a second set of parameters, wherein the second set of parameters comprises different parameters than the first set of parameters; debinarizing the second bin stream to form the second decoded syntax element; and reconstructing a picture of the video data based in part on the first decoded syntax element and the second decoded syntax element.

According to another example, a device for decoding video data includes a memory configured to store a bitstream of video data and one or more processors in communication with the memory and implemented in processing circuitry, wherein the one or more processors are configured to: determine a first decoded syntax element by applying binary arithmetic decoding to an encoded version of the first syntax element included in a bitstream of the video data, wherein to apply the binary arithmetic decoding to the encoded version of the first syntax element, the one or more processors are further configured to: generate a first bin stream by determining a first probability estimation for at least one bin of the first bin stream based on a first set of parameters; debinarize the first bin stream to form the first decoded syntax element; determine a second decoded syntax element by applying the binary arithmetic decoding to an encoded version of the second syntax element included in the bitstream of the video data, wherein to apply the binary arithmetic decoding to the encoded version of the second syntax element, the one or more processors are further configured to: generate a second bin stream by determining a second probability estimation for at least one bin of the second bin stream based on a second set of parameters, wherein the second set of parameters comprises different parameters than the first set of parameters; debinarize the second bin stream to form the second decoded syntax element; and reconstruct a picture of the video data based in part on the first decoded syntax element and the second decoded syntax element.

According to another example, a computer readable medium stores instructions that when executed by one or more processors cause the one or more processors to determine a first decoded syntax element by applying binary arithmetic decoding to an encoded version of the first syntax element included in a bitstream of the video data, wherein to apply the binary arithmetic decoding to the encoded version of the first syntax element, the instructions cause the one or more processors to: generate a first bin stream, wherein to generate the first bin stream, the instructions cause the one or more processors to determine a first probability estimation for at least one bin of the first bin stream based on a first set of parameters; debinarize the first bin stream to form the first decoded syntax element; determine a second decoded syntax element by applying the binary arithmetic decoding to an encoded version of the second syntax element included in the bitstream of the video data, wherein to apply the binary arithmetic decoding to the encoded version of the second syntax element, the instructions cause the one or more processors to: generate a second bin stream, wherein to generate the second bin stream, the instructions cause the one or more processors to determine a second probability estimation for the at least one bin of the second bin stream based on a second set of parameters, wherein the second set of parameters comprises different parameters than the first set of parameters; debinarize the second bin stream to form the second decoded syntax element; and reconstruct a picture of the video data based in part on the first decoded syntax element and the second decoded syntax element.

According to another example, an apparatus for decoding video data includes means for determining a first decoded syntax element by applying binary arithmetic decoding to an encoded version of the first syntax element included in a bitstream of the video data, wherein the means for means for determining the first decoded syntax element comprises: means for generating a first bin stream, wherein the means for generating the first bin stream comprises, means for determining a first probability estimation for the at least one bin of the first bin stream based on a first set of parameters; means for debinarizing the first bin stream to form the first decoded syntax element; means for determining a second decoded syntax element by applying the binary arithmetic decoding to an encoded version of the second syntax element included in the bitstream of the video data, wherein the means for determining the second decoded syntax element comprises: means for generating a second bin stream, wherein the means for generating the second bin stream comprises, means for determining a second probability estimation for at least one bin of the second bin stream based on a second set of parameters, wherein the second set of parameters comprises different parameters than the first set of parameters; means for debinarizing the second bin stream to form the second decoded syntax element; and means for reconstructing a picture of the video data based in part on the first decoded syntax element and the second decoded syntax element.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure describes techniques related to arithmetic coding, and more specifically, to binary arithmetic coding with progressive modification of adaptation parameters. The techniques of this disclosure may be implemented into existing video codecs, such as HEVC (High Efficiency Video Coding), or be an efficient coding tool for a future video coding standard, such as the H.266 standard presently under development.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current block, current picture, or other "current" elements. In the context of this disclosure, the term "current" is intended to identify a block or picture that is currently being coded, as opposed to, for example, previously or already coded block or picture, or a yet to be coded block or picture.

This disclosure describes video coding techniques using HEVC terminology for ease of explanation. It should not be assumed, however, that the techniques of this disclosure are limited to use with HEVC, and in fact, it is explicitly contemplated that the techniques of this disclosure may be implemented with other video techniques and standards, such as successor standards to HEVC and HEVC extensions.

Figure 1:
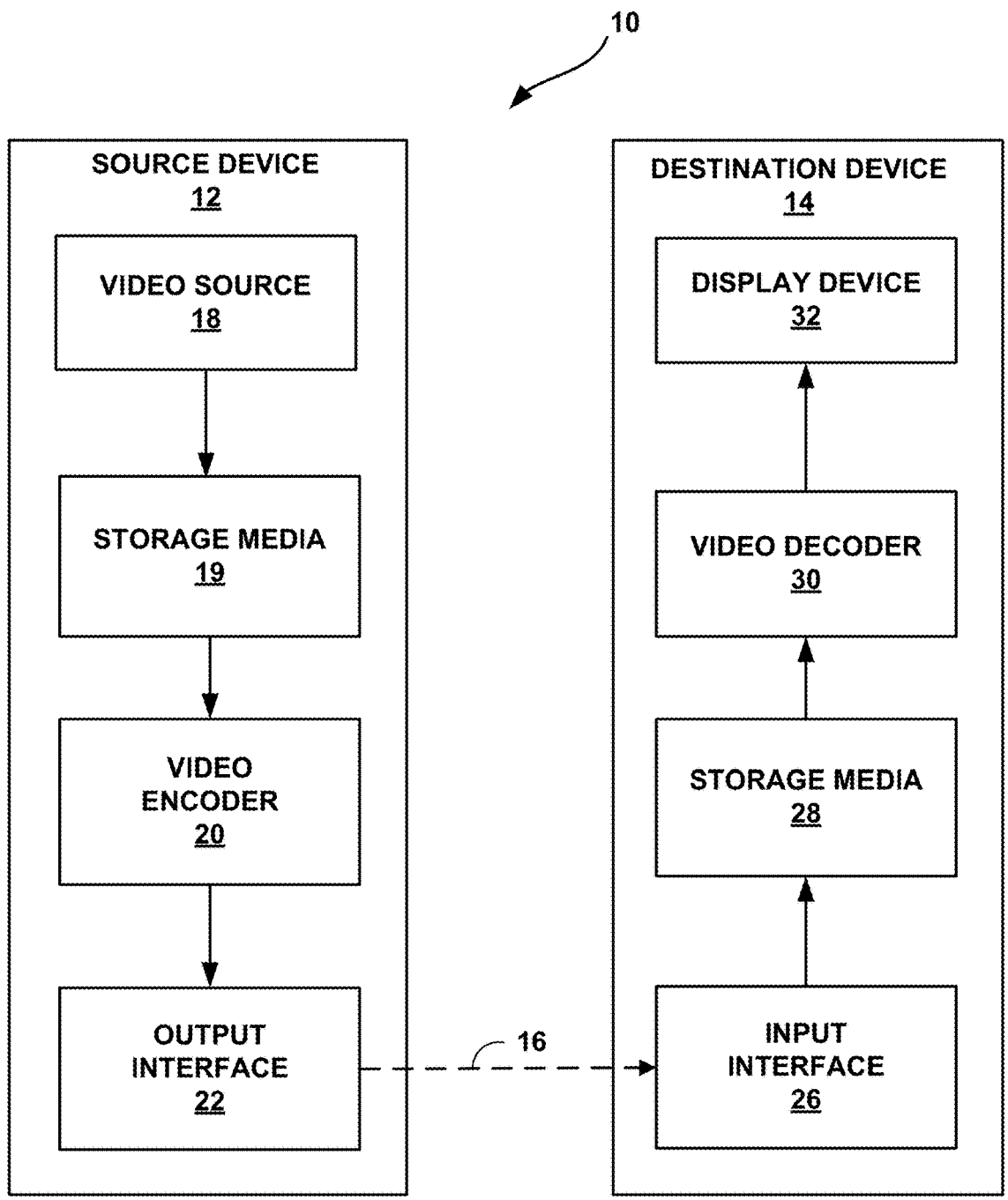
FIG. 1 is a block diagram illustrating an example video encoding and decoding system that may use one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14.

Source device 12 provides the encoded video data to destination device 14 via a computer-readable medium 16. Source device 12 and destination device 14 may be any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may include a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 28 of destination device 12 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the, High Efficiency Video Coding (HEVC), which as known as or ITU-T H.265, its range and screen content coding extensions, its 3D video coding extension (3D-HEVC), its multiview extension (MV-HEVC), or its scalable extension (SHVC).

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in an bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture. It should be noted that the CTBs and CTUs described above represent merely one manner of partitioning a picture into blocks, and the techniques of this disclosure are not limited to any particular type of block structure. Successor standards to HEVC are proposing alternatives to the CTU/CTB structure introduced above, and it is contemplated that the techniques of this disclosure may be used with such new block structures.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction unit" syntax structure within a "coding_unit" syntax structure for inter predicted PUs, but does not generate a "prediction unit" syntax structure within a "coding_unit" syntax structure for intra predicted PUs. Rather, in HEVC, syntax elements related to intra predicted PUs are included directly in the "coding_unit" syntax structure.

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, video encoder 20 and video decoder 30 may apply CABAC encoding and decoding to syntax elements. To apply CABAC encoding to a syntax element, video encoder 20 may binarize the syntax element to form a series of one or more bits, which are referred to as "bins." In addition, video encoder 20 may identify a coding context. The coding context may identify probabilities of bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

Video encoder 20 may encode some bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 20 and video decoder 30. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

Arithmetic coding is a fundamental tool used in data compression. See e.g., I. H. Witten, R. M. Neal, and J. G. Cleary, "Arithmetic coding for data compression," Commun. ACM, vol. 30, no. 6, pp. 520-540, June 1987 (hereinafter, "Reference 1"); A. Said, "Arithmetic Coding," in Lossless Compression Handbook, K. Sayood, Ed., Academic Press, chapter 5, pp. 101-152, 2003 (hereinafter, "Reference 2"); A. Said, "Introduction to arithmetic coding—theory and practice," Hewlett Packard Laboratories, Palo Alto, Calif., USA, Technical Report HPL-2004-76, April 2004, (http://www.hpl.hp.com/techreports/2004/HPL-2004-76.pdf) (hereinafter, "Reference 3").

Arithmetic coding was optional in the AVC/H.264 video compression standard. See I. D. Marpe, H. Schwarz, and T. Wiegand, "Context-based adaptive binary arithmetic coding in the H.264/AVC video compression standard," IEEE Trans. Circuits Syst. Video Technol., vol. 13, no. 7, pp. 620-636, July 2003 (hereinafter, "Reference 4"); I. E. Richardson, The H.264 Advanced Video Compression Standard, 2nd ed., John Wiley and Sons Ltd., 2010 (hereinafter, "Reference 5").

Arithmetic coding became the only entropy coding technique of video coding standards HEVC/H.265 and VP9. See V. Sze and M. Budagavi, "High throughput CABAC entropy coding in HEVC," IEEE Trans. Circuits Syst. Video Technol., vol. 22, no. 12, pp. 1778-1791, December 2012 (hereinafter, "Reference 6"); V. Sze and D. Marpe, "Entropy coding in HEVC," in High Efficiency Video Coding (HEVC): Algorithms and Architectures, V. Sze, M. Budagavi, and G. J. Sullivan, Eds., chapter 8, pp. 209-274. Springer, 2014 (hereinafter, "Reference 7"); M. Wien, High Efficiency Video Coding: Coding Tools and Specification, Springer-Verlag, 2015 (hereinafter, "Reference 8"); D. Mukherjee, J. Bankoski, R. S. Bultje, A. Grange, J. Han, J. Koleszar, P. Wilkins, and Y. Xu, "The latest open-source video codec VP9—an overview and preliminary results," in Proc. 30th Picture Coding Symp., San Jose, Calif., December 2013 (hereinafter, "Reference 9").

Due to the superior compression efficiency of arithmetic coding relative to other entropy coding techniques, arithmetic coding is expected to remain the only entropy coding technique used in newly emerging video coding standards presently under development. However, one of the main problems of using entropy coding in practical applications is that the most effective techniques are designed to be optimal for stationary data sources, but real data from complex signals (like video) are far from stationary. Current solutions use data classification and adaptive coding techniques to address this problem, and techniques of this disclosure may increase the efficiency of adaptation techniques.

Techniques of this disclosure may improve compression efficiency by exploiting the fact that, even when the data is finely divided in many classes (coding contexts), there is still much variability in the statistics of the data assigned for each class. So, instead of using a single "universal" adaptation technique for all classes, this disclosure proposes changing adaptation parameters according to each class, and within each class, further changing the adaptation parameters according to expected or observed probability values or measured variations in the estimates.

This disclosure also describes techniques that may increase the efficiency of adaptation techniques, considering that there is higher uncertainty when the adaptation starts, and less after it reaches a type of steady-state. The disclosure also describes various techniques that may improve on the techniques already introduced by extending the change in adaptation parameters to depend not only on external data, like context number, quality selection, etc., but also on some measure of the adaptation progress, like counters of encoded bins, and position(s) of a block that one or more contexts is associated with in the video frame. These factors may be combined to simplify the implementation of the arithmetic coding engine by reducing the situations when the adaptation parameters need to be changed.

Figure 10A:
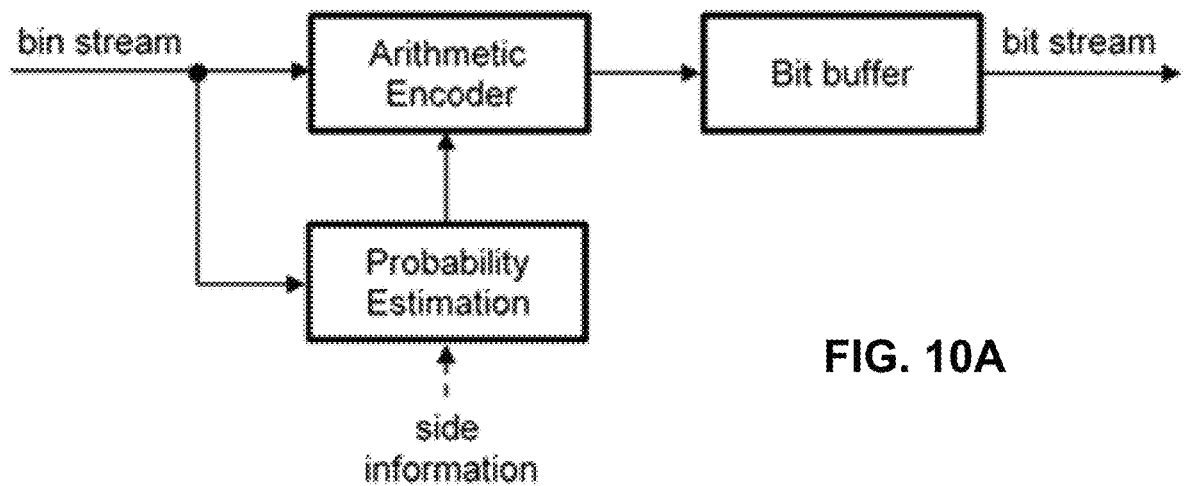
FIG. 10A shows an example of an encoder architecture for entropy coding.
Figure 10B:
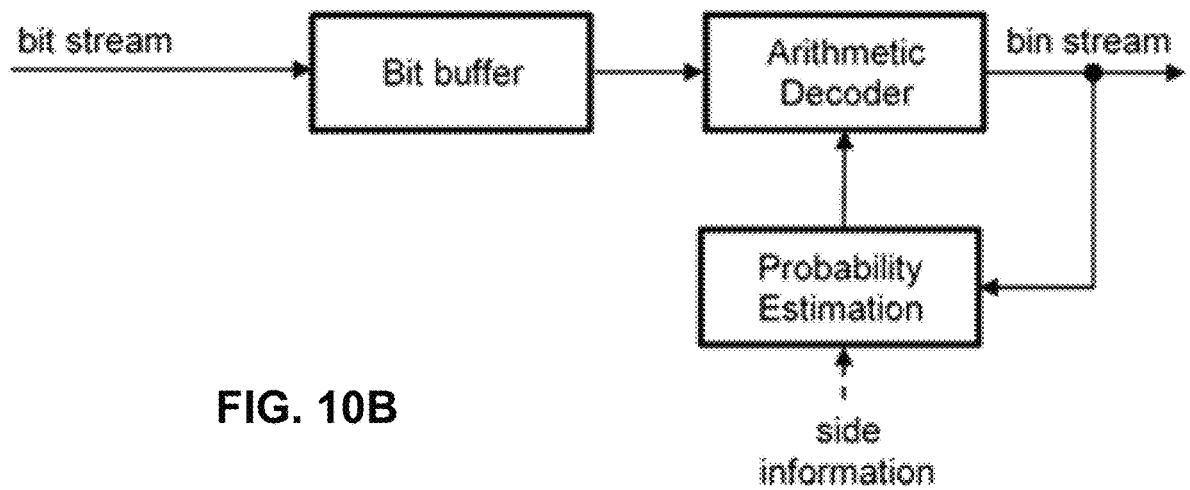
FIG. 10B shows an example of a decoder architecture for entropy decoding.

As described in References 1, 2, and 3, modern video coding standards adopt the strategy of decomposing entropy coding into modeling and actual coding. Thus, the binary arithmetic coding process (see, e.g., a typical entropy encoder and decoder such as the architecture in FIGS. 10A and 10B) used in modern video compression standards is divided into three main stages. The first stage is binarization, where each data element (or syntax element) to be coded is first decomposed into a sequence of binary data symbols (bins). Since binary symbol probabilities depend on the data element and binary symbol position in its decomposition, a bin context (or simply context) is assigned for each type of binary symbol, uniquely identifying the probability estimate to be used for its entropy coding. The second stage is adaptive probability estimation. As it is assumed that all bins assigned to a given context have similar, but not exactly equal probabilities, the encoder and decoder update their probability estimates based on the bin values that have been previously encoded or decoded. The third stage is arithmetic coding, where the value of each binary symbol (0 or 1) is entropy coded using the estimated probability of its value, which is defined by the bin's corresponding context.

Figure 11A:
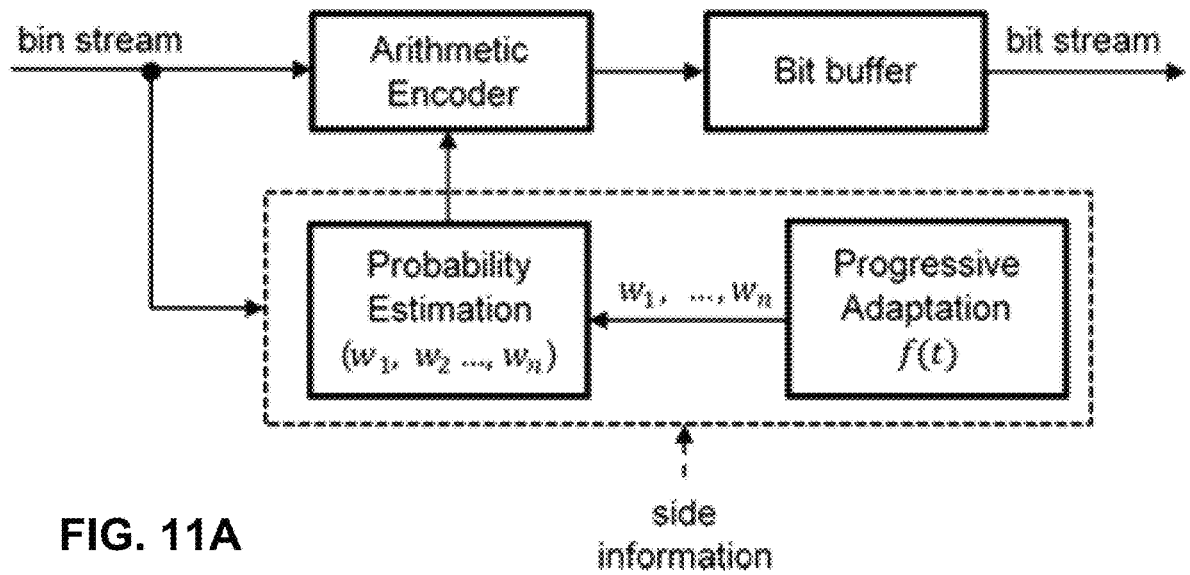
FIG. 11A shows an example of an encoder architecture for entropy coding that utilizes progressive adaptation.
Figure 11B:
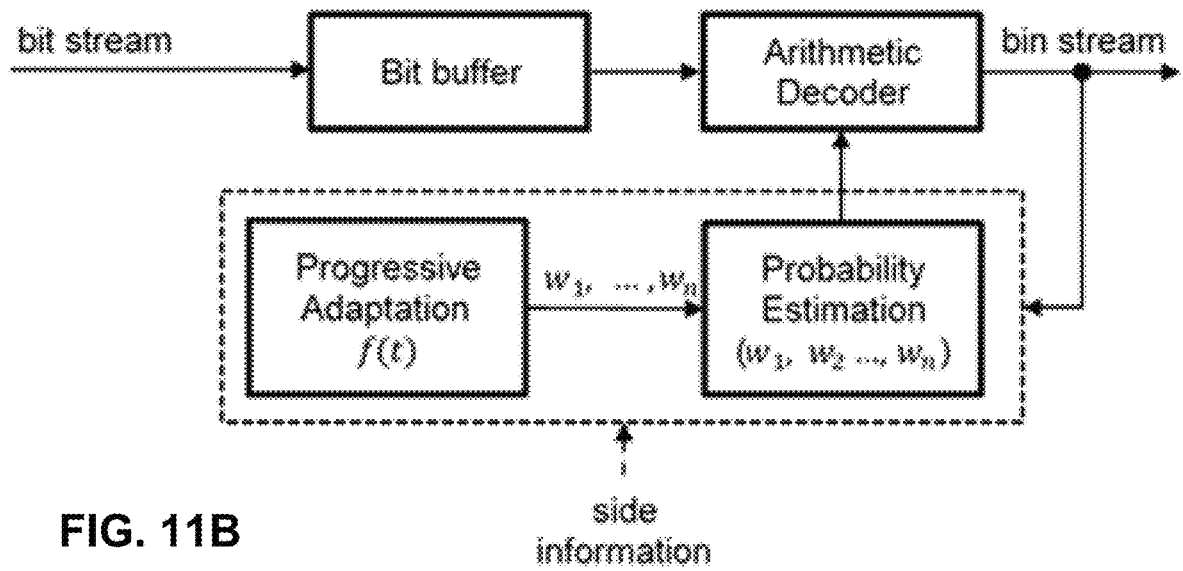
FIG. 11B shows an example of a decoder architecture for entropy decoding that utilizes progressive adaptation.

The techniques of this disclosure may obtain better compression relative to existing techniques by improving the adaptive probability estimation. FIGS. 11A and 11B illustrate the proposed techniques as an extension to the typical encoder/decoder architecture depicted in FIGS. 10A and 10B.

Example techniques used in practice for binary probability estimation are presented in the following references:

F. T. Leighton and R. L. Rivest, "Estimating a probability using finite memory," IEEE Trans. Inf. Theory, vol. 32, no. 6, pp. 733-742, November 1986 (hereinafter, "Reference 10").

W. B. Pennebaker and J. L. Mitchell, "Probability estimation for the Q-Coder," IBM J. Res. Develop., vol. 32, no. 6, pp. 737-752, November 1988 (hereinafter, "Reference 11").

P. G. Howard and J. S. Vitter, "Practical implementations of arithmetic coding," in Image and Text Compression, J. A. Storer, Ed., chapter 4, pp. 85-112. Kluwer Academic Publishers, Norwell, Mass., 1992 (hereinafter, "Reference 12").

E. Meron and M. Feder, "Finite-memory universal prediction of individual sequences," IEEE Trans. Inf. Theory, vol. 50, no. 7, pp. 1506-1523, July 2004 (hereinafter, "Reference 13").

E. Belyaev, M. Gilmutdinov, and A. Turlikov, "Binary arithmetic coding system with adaptive probability estimation by 'virtual sliding window'," in Proc. IEEE Int. Symp. Consumer Electronics, St. Petersburg, Russia, June 2006 (hereinafter, "Reference 14").

To achieve very low computational complexity practical requirements, the probability estimation is commonly done using some type of finite-state-machine (FSM).

For ease of explanation of the techniques of this disclosure, this disclosure does not cover all of the details about the implementation of the FSMs of References 10-14, but it is useful to define a proper terminology, and some examples are presented at the end of this section.

Figure 2:
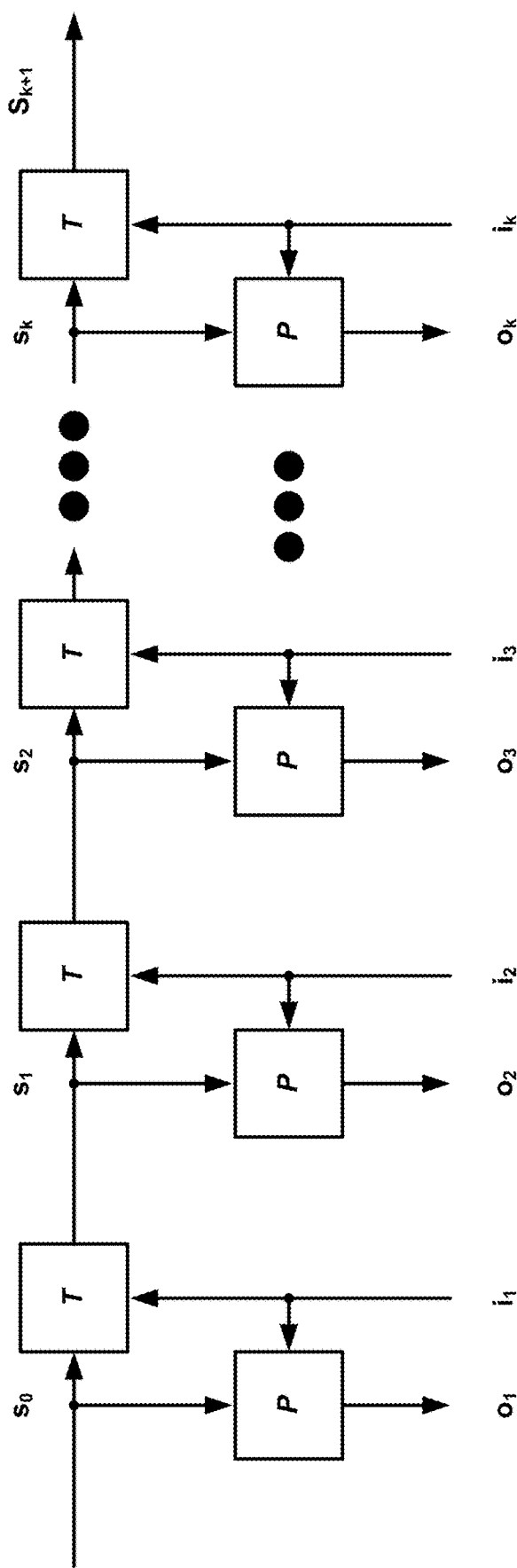
FIG. 2 is a block diagram of an example general finite state machine.

FIG. 2 is a block diagram of an example general FSM. More specifically, FIG. 2 is a graphical representation of sequence of state transitions, input, and output in a general finite state machine. In FIG. 2, the sequences $\{s_n\}$, $\{i_n\}$, $\{o_n\}$ represent, respectively, the states, inputs, and outputs of the FSM, which are vectors with integer elements (the vector dimensions and their sets of allowed element values have to be well defined but are not important for this discussion).

Following the definitions above, the arrows in the diagram of FIG. 2 represent the state updating equation and the output equation, which are $$s_n = T(i_n, s_{n-1}), o_n = P(i_n, s_{n-1}), \quad (1)$$

where T is the state updating function, and P is the output function.

For the probability estimation FSMs of this disclosure, the inputs are bin values, and the outputs are bin probability estimates. Its use during entropy encoding and decoding is shown in FIG. 3, FIG. 4, FIG. 5, and FIG. 6, where by convention the binary probability estimation FSM is called coding context.

Figure 3:
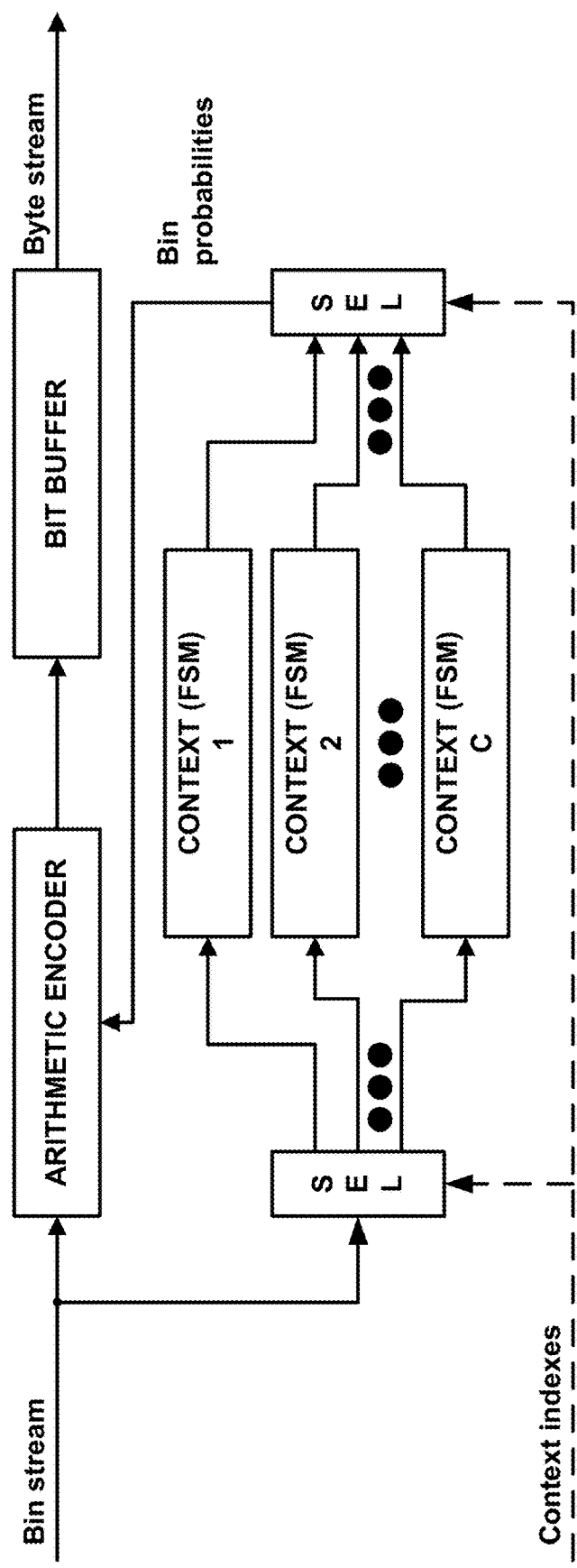
FIG. 3 is an example block diagram for context-based binary arithmetic encoding using many finite state machines (FSMs) for bin probability estimation.
Figure 4:
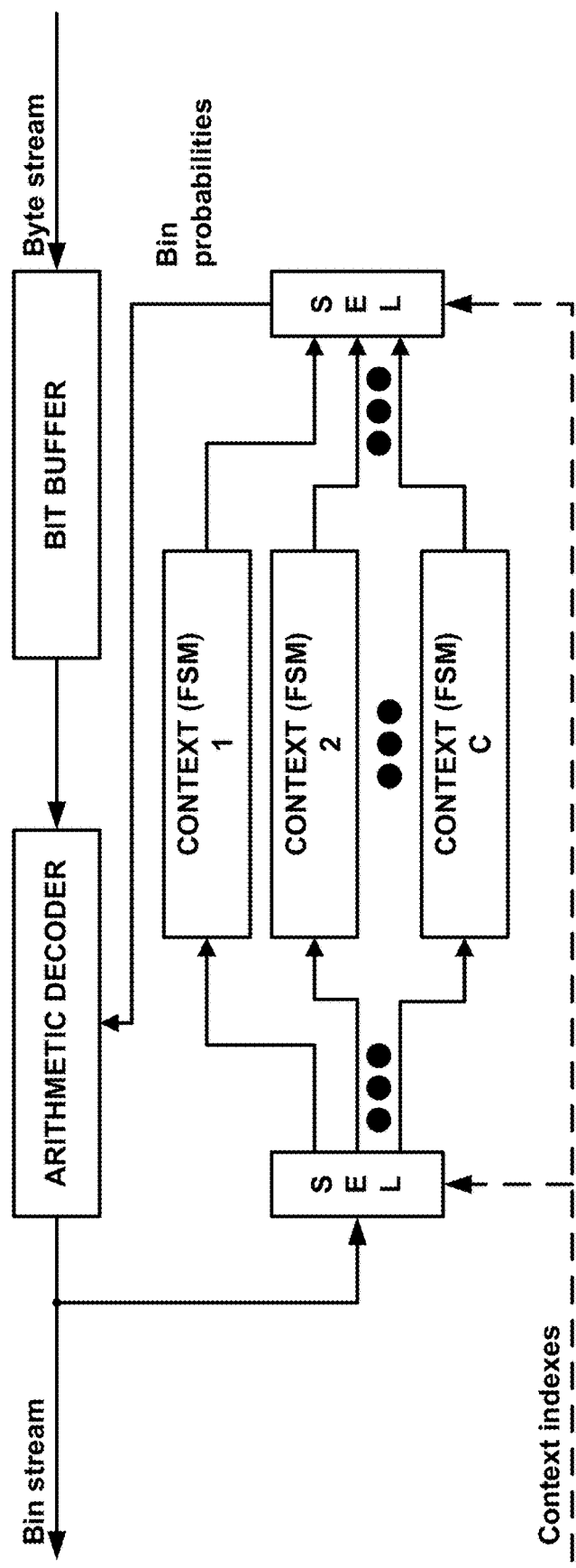
FIG. 4 is an example block diagram for context-based binary arithmetic decoding using many FSMs for bin probability estimation.

As shown in the example of FIG. 3 and FIG. 4, in practical video coding the entropy coding stage is implemented by using a large number of coding contexts, which are selected during encoding and decoding depending on the type (or class) of the bin being encoded or decoded.

Figure 5:
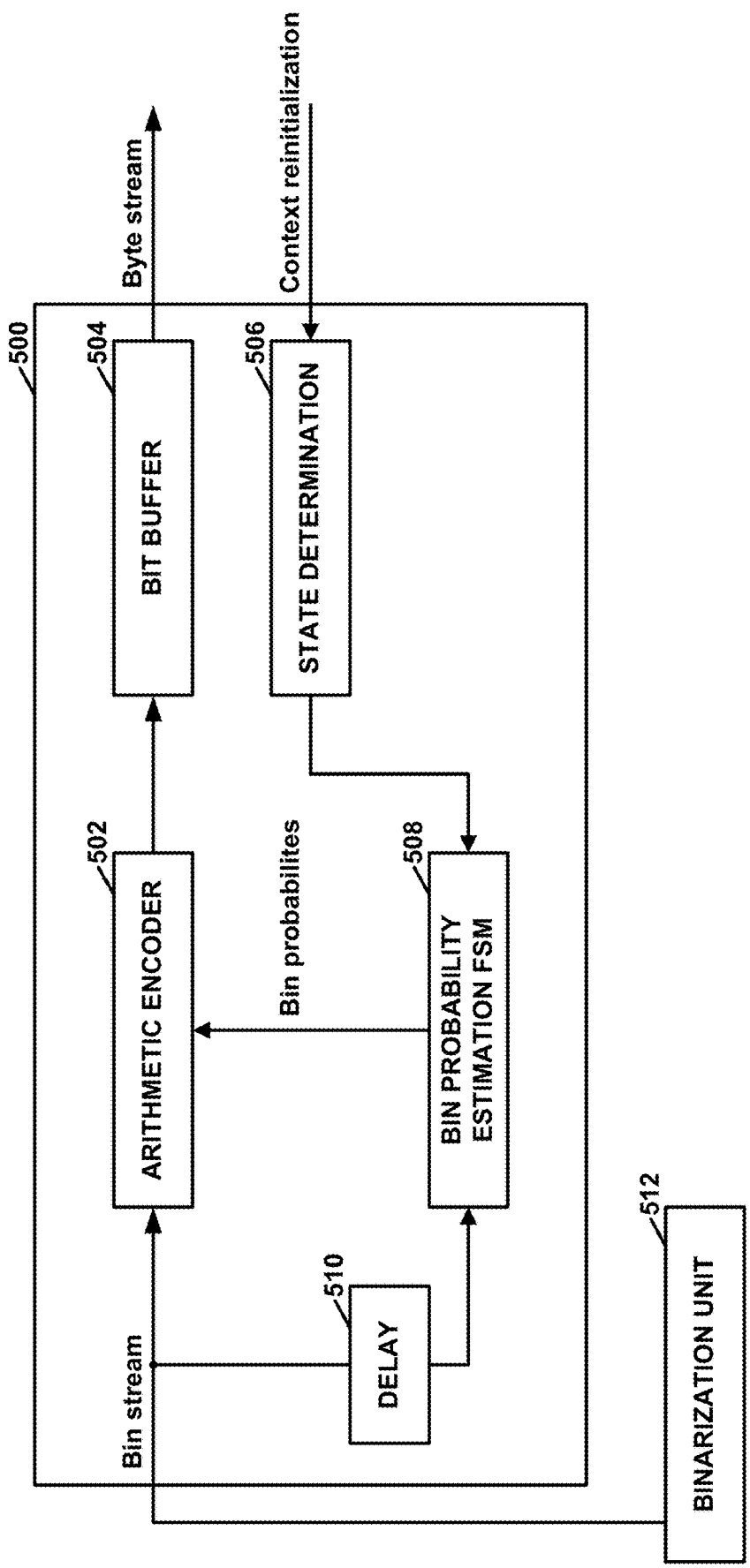
FIG. 5 is an example block diagram for context-based binary arithmetic encoding considering a single selected context.

FIG. 5 is an example block diagram for context-based binary arithmetic encoding considering a single selected context. In FIG. 5, an arithmetic encoding unit 700 includes an arithmetic encoder 502, a bit buffer 504, a state determination unit 506, and a probability estimation FSM unit 508. Arithmetic encoding unit 500 may, in some examples, receive a bin stream from a binarization unit 512. Arithmetic encoding unit 500 and binarization unit 512 may form part of entropy encoding unit 118, described in more detail with respect to FIG. 13. Binarization unit 512 encodes each data element (e.g., syntax element) into a sequence of binary data symbols (bins). The sequence of binary data symbols may be referred to as a "bin stream." Additionally, arithmetic encoding unit 500 may receive a context reinitialization signal. For instance, arithmetic encoding unit 500 may receive a context reinitialization signal when arithmetic encoding unit 500 starts encoding a different type of binary symbol.

Furthermore, in FIG. 5, in response to receiving a context reinitialization signal, state determination unit 506 may reinitialize a state of a probability estimation FSM. In general, reinitialization refers to resetting the probability estimates to the initial probability estimates associated with a coding context. For example, based on the type of binary symbol to be encoded, state determination unit 506 may look up initial probability estimates in a predefined table. The predefined table may be defined by a video coding standard, such as HEVC. State determination unit 506 may provide the determined initial probability estimates to bin probability estimation FSM unit 508. For the first bin of the bin stream, bin probability estimation FSM unit 508 provides the initial probability estimates to arithmetic encoder 502. Additionally, bin probability estimation FSM unit 508 updates the probability estimates based on the actual value of the first bin of the bin stream. For each subsequent bin until state determination unit 506 resets the probability estimates, bin probability estimation FSM unit 508 updates the probability estimates according to a state updating function, e.g., as shown in equation (1).

For each bin of the bin stream, arithmetic encoder 502 may use the probability estimates provided by bin probability estimation FSM unit 508 to encode the bin as described elsewhere in this disclosure with respect to CABAC. Bit buffer 504 may store the bins encoded by arithmetic encoder 502. In FIG. 5, delay box 510 signifies that the bin probabilities generated by bin probability estimation FSM unit 508 are based on a bin previous to the bin currently being encoded by arithmetic encoder 502.

Figure 6:
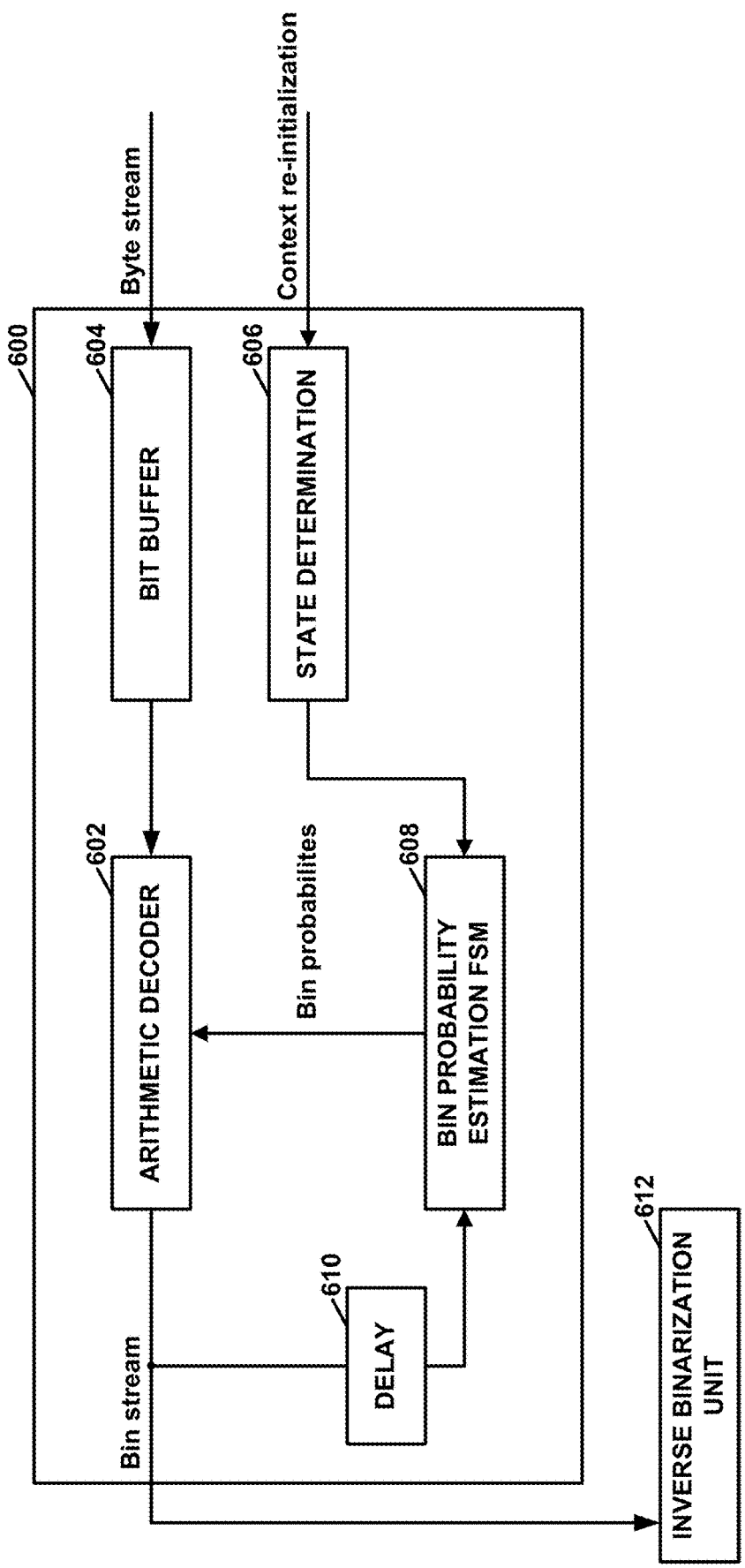
FIG. 6 is an example block diagram for context-based binary arithmetic decoding considering a single selected context.

FIG. 6 is an example block diagram for context-based binary arithmetic decoding considering a single selected context. In FIG. 6, an arithmetic decoding unit 600 includes an arithmetic decoder 602, a bit buffer 604, a state determination unit 606, and a probability estimation FSM unit 608. Arithmetic decoding unit 600 generates a bin stream that may, in some examples, be received by an inverse binarization unit 612. Arithmetic decoding unit 800 and inverse binarization unit 612 may form part of entropy decoding unit 150 of FIG. 14. Inverse binarization unit 612 converts the bin stream into a series of one or more syntax elements.

In FIG. 6, arithmetic decoding unit 600 receives a byte stream, which may be parsed from a bitstream received by video decoder 30. Additionally, arithmetic decoding unit 600 may receive a context reinitialization signal. For instance, arithmetic decoding unit 600 may receive a context reinitialization signal when arithmetic decoding unit 600 starts encoding a different type of binary symbol. Furthermore, in FIG. 6, in response to receiving a context reinitialization signal, state determination unit 606 may reinitialize a state of a probability estimation FSM. For example, based on the type of binary symbol to be encoded, state determination unit 606 may look up initial probability estimates in a predefined table. The predefined table may be defined by a video coding standard, such as HEVC. The predefined table may be the same as the table used by state determination unit 506 (FIG. 5). State determination unit 606 may provide the determined initial probability estimates to bin probability estimation FSM unit 808. For the first bin of the bin stream, bin probability estimation FSM unit 608 provides the initial probability estimates to arithmetic decoder 602. Additionally, bin probability estimation FSM unit 608 updates the probability estimates based on the actual value of the first bin of the bin stream. For each subsequent bin until state determination unit 606 resets the probability estimates, bin probability estimation FSM unit 608 updates the probability estimates according to a state updating function, e.g., as shown in equation (1).

For each bin of the bin stream, arithmetic decoder 602 may use the probability estimates provided by bin probability estimation FSM unit 608 to decode the bin as described elsewhere in this disclosure with respect to CABAC. Bit buffer 604 may store the bins to be decoded by arithmetic decoder 602. In FIG. 6, delay box 610 signifies that the bin probabilities generated by bin probability estimation FSM unit 808 are based on a bin previous to the bin currently being decoded by arithmetic decoder 802.

FIG. 5 and FIG. 6 show simplified diagrams, considering the exemplary case in which a single context has been selected. FIG. 5 and FIG. 6 also show one feature always present in practical application, which is the need to periodically re-synchronize the encoder and decoder states, using a shared table with data that in converted to encoder states. For example, in the HEVC standard, the contexts are periodically re-initialized with a table defining, for each context, how to convert from a compression-quality parameter (known as quantization step, or quantization parameter (QP) value) (see References 7 and 8) to FSM states.

Among the more recent approaches to binary probability estimation, the HEVC standard adopts a table look-up based technique, described in references 7 and 8, which may be supplemented and/or replaced by techniques of this disclosure. In the latest ITU-T/MPEG JVET, two forms of probability update techniques have been proposed. The first technique is based on the following recursive formula, described in references 13 and 14:

$$p[k+1] = p[k] + \left\lfloor \frac{2^{15}b[k] - p[k]}{2^a} \right\rfloor, \quad (1)$$

where $p[k]$ denotes an integer sequence of scaled probability estimates, $b[k]$ is the binary sequence of bin values, and a is a positive integer, enabling the multiplications and divisions to be implemented with bit-shifts. The second technique uses the following probability updates derived based on the following set of equations proposed by A. Alshin, E. Alshina, and J.-H. Park, "High precision probability estimation for CABAC," in Proc. IEEE Visual Commun. Image Process. Conf., Kuching, Malaysia, November 2013 (hereinafter, "Reference 15"):

$$q_1[k+1] = q_1[k] + \left\lfloor \frac{2^{15}b[k] - q_1[k]}{2^4} \right\rfloor, \quad (2)$$

$$q_2[k+1] = q_2[k] + \left\lfloor \frac{2^{15}b[k] - q_2[k]}{2^8} \right\rfloor \quad (3)$$

$$p[k+1] = \left\lfloor \frac{q_1[k+1] + q_2[k+1]}{2} \right\rfloor. \quad (4)$$

Note that in this case the probability estimation is done for each k by first calculating the pair $(q_1[k+1], q_2[k+1])$ as in (2) and (3), and then averaging them as in (4). Thus, this type of estimation is a two-step estimation where the intermediate probability estimates, $q_1[k+1]$ and $q_2[k+1]$ have to be updated and stored.

An earlier version of ITU-T/MPEG JVET proposal uses the techniques originally described in references 15 and 19. The above two types of probability estimation techniques are combined so that initially the single-step probability estimation in (1) is used for a certain number of bins, and then (2) after a pre-determined threshold is reached the two-step estimation approach, in (2)-(4), is employed. This technique specifically requires a counter for counting the number of bins to determine if the number of input bins has reached the selected threshold.

According to techniques of this disclosure equations (2)-(4) above may be changed to use positive integers (a, b) as parameters in equations:

$$q_1[k+1] = q_1[k] + \left\lfloor \frac{2^{15}b[k] - q_1[k]}{2^a} \right\rfloor,$$

-continued $$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor.$$

The parameters (a, b) are defined with different values for each of the encoding/decoding contexts (binary syntax elements) of the JVET video encoder, with values also possibly varying them depending on other factors, such as slice type, and slice QP values, and other factors described above.

As entropy coding is designed to be optimal for stationary data sources, the practical effectiveness depends on classifying data elements, so that the statistics in each class is approximately stationary, making it possible to use estimation FSMs that are nearly "universal," i.e., adapt equally well for all data contexts. Accordingly, in FIG. 4 and FIG. 5, the FSMs may not be changed but, instead, only have the states re-initialized periodically.

This disclosure addresses the fact that in practice there are no truly "universally optimal" FSMs, since not only probabilities change for each context, but also the speed and magnitude of changes differ among context. This disclosure describes a solution to this problem that exploits the fact that variation occurs according to context or estimated probability, but the best strategy is to exploit both for determining the optimal FSM. Techniques of this disclosure also cover the option of choosing FSM parameters by evaluating the evolution of FSM states. For example, measuring the difference between more than one estimation.

In accordance with one or more techniques of this disclosure, the conventional definition of FSMs is changed, and the techniques of this disclosure also define a FSM parameter vector h, which can be used to change the FSM responses. With this definition, eq. (1) can be rewritten, i.e. re-define the state updating and the output equations, as:

$$s_n = T(i_n, s_{n-1}, h), o_n = P(i_n, s_{n-1}, h),$$

where now T is the parameterized state updating function, and P is the parameterized output function.

With this definition, two factors that define FSM coding performance can be identified:

FSM states ($s_n$): contains the numerical or logical information directly used for computing the probabilities of the binary symbols, and are the only data changed by re-initialization in previous standards;

FSM parameters (h): define state updating, and how probability estimates are computed from the states; the techniques of this disclosure may improve compression by modifying these parameters during coding or during re-initialization.

For example, the FSM equation in (2) can be changed to use positive integers (a, b) as parameters in equations:

$$q_1[k+1] = q_1[k] + \left\lfloor \frac{2^{15}b[k] - q_1[k]}{2^a} \right\rfloor,$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor.$$

Parameters a and b may be used to determine the estimated probability for a next bin (i.e., $p[k+1]$). Therefore, parameters a and b in equation (4) may be considered to be for the next bin. In equation (4), the parameters (a, b) may change the state transitions, but not the output equation. This distinction is used because, even though it is mathematically possible to define the FSM parameters as part of the FSM state, this represents a practical difference.

Figure 7:
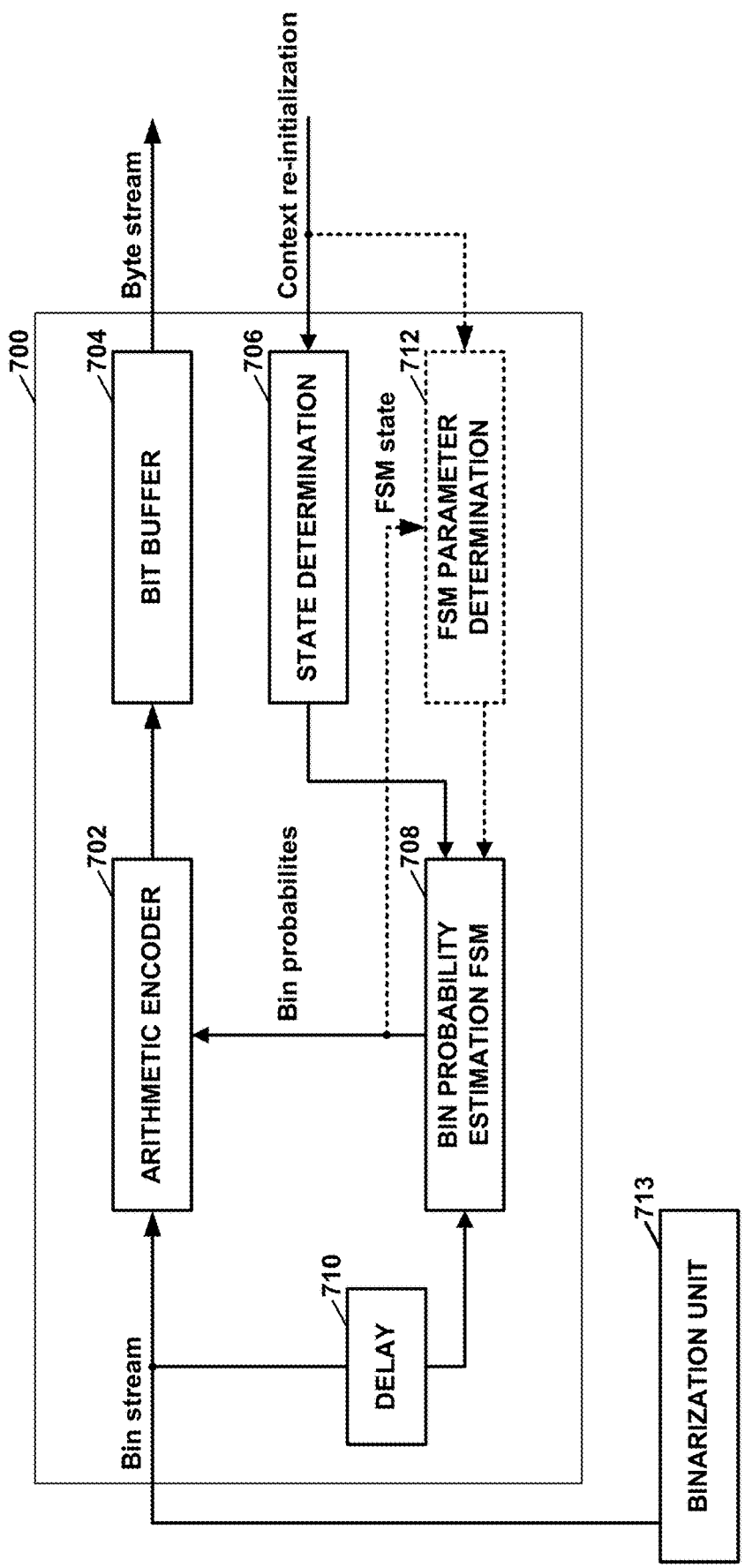
FIG. 7 is an example block diagram for context-based arithmetic encoding, in accordance with one or more aspects of this disclosure.
Figure 8:
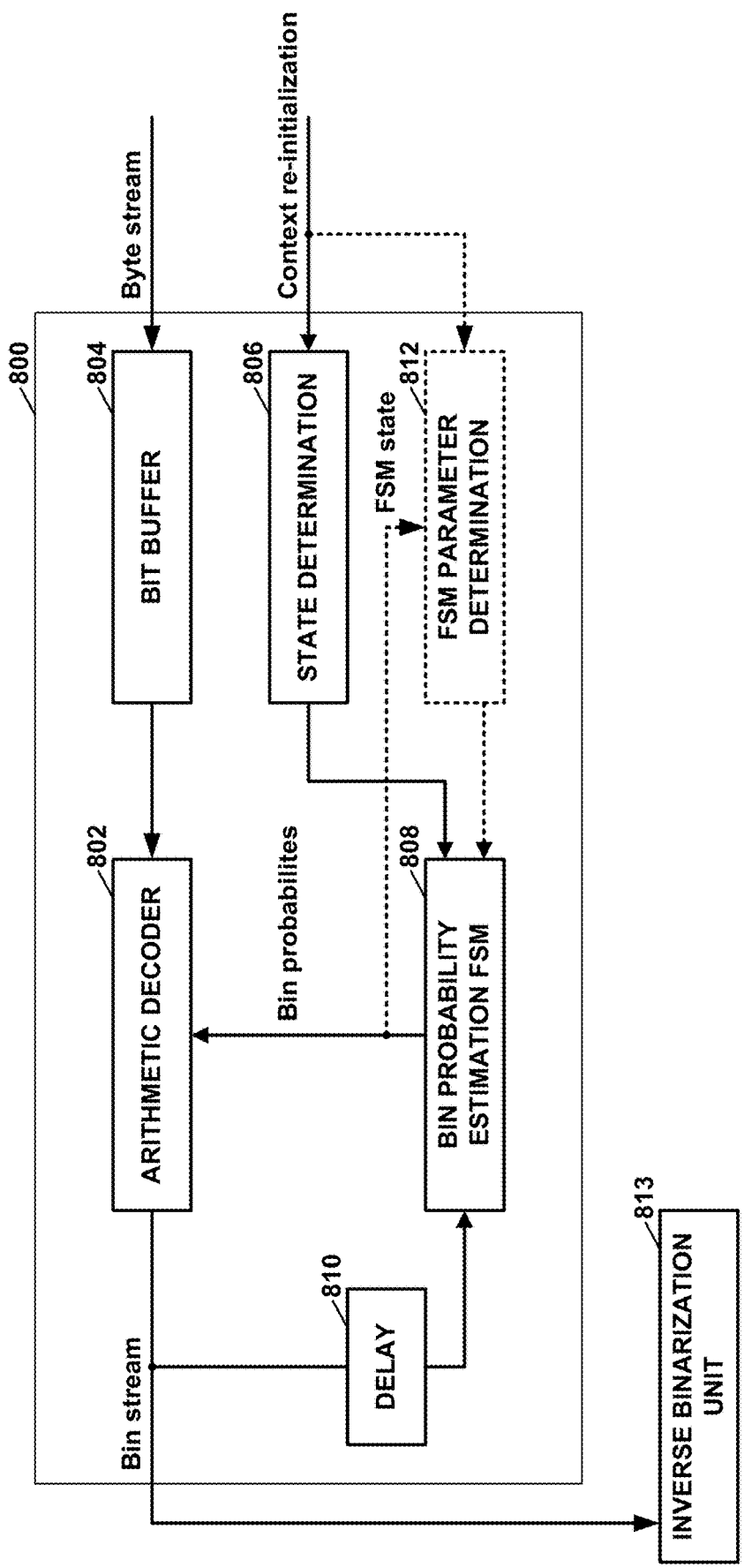
FIG. 8 is an example block diagram for context-based arithmetic decoding, in accordance with one or more aspects of this disclosure.

FIG. 7 and FIG. 8 show how techniques of this disclosure may be integrated in an arithmetic coding process. In the example of FIG. 7, an arithmetic encoding unit 700 includes an arithmetic encoder 702, a bit buffer 704, a state determination unit 706, a probability estimation FSM unit 708, and a FSM parameter determination unit 712. Arithmetic encoding unit 700 may, in some examples, receive a bin stream from a binarization unit 713. Arithmetic encoding unit 700 and binarization unit 713 may form part of entropy encoding unit 218 of FIG. 2. Binarization unit 713, arithmetic encoder 702, bit buffer 704, state determination unit 706, and delay box 710 may operate in the same manner as binarization unit 713, arithmetic encoder 702, bit buffer 704, state determination unit 706, and delay box 710 in FIG. 7.

In the example of FIG. 8, an arithmetic decoding unit 800 includes an arithmetic decoder 802, a bit buffer 804, a state determination unit 806, a probability estimation FSM unit 808, and a FSM parameter determination unit 812. Arithmetic decoding unit 800 generates a bin stream that may, in some examples, be received by an inverse binarization unit 813. Arithmetic decoding unit 800 and inverse binarization unit 813 may form part of entropy decoding unit 300 of FIG. 3. Inverse binarization unit 813 converts the bin stream into a series of one or more syntax elements. Binarization unit 813, arithmetic decoder 802, bit buffer 804, state determination unit 806, and delay box 810 may operate in the same manner as inverse binarization unit 812, arithmetic decoder 802, bit buffer 804, state determination unit 806, and delay box 810 in FIG. 8.

The main difference (shown in dashed lines in FIG. 7 and FIG. 8) from FIG. 7 and FIG. 8 is the FSM parameter determination units 712, 812 included in FIG. 7 and FIG. 8. FSM parameter determination units 712, 812 determine FSM parameters (e.g., a and b in equation (4)). FSM parameter determination unit 712, 812 may determine the FSM parameters during coding, in response to context reinitialization events, or in other situations. Thus, in FIG. 7 and FIG. 8, parameterized-context FSMs can be modified during coding or re-initialization, by the FSM parameter determination unit 712, 812, using probability values, quality factors, and other data. Note that the data fed to FSM parameter determination units 712, 812 can comprise or consist of re-initialization parameters, and also current states (e.g., bin probabilities).

Thus, in accordance with one or more techniques of this disclosure, video encoder 20 may receive video data. The video data may comprise one or more pictures. Furthermore, prediction processing unit 200, quantization unit 206, and potentially other components of video encoder 20 may generate syntax elements based on the video data. In this example, entropy encoding unit 218 may determine an offset value by applying binary arithmetic encoding to one of the generated syntax elements. As part of applying the binary arithmetic encoding, entropy encoding unit 218 may generate a bin stream by binarizing one or more syntax elements. Furthermore, for at least one respective bin of the bin stream (e.g., a particular bin of the bin stream, each bin of the bin stream, each bin of the bin stream other than a last bin of the bin stream, etc.), entropy encoding unit 218 may determine, based on a state for the respective bin, an interval for the respective bin, and a value of the respective bin, an interval for a next bin of the bin stream. Additionally, entropy encoding unit 218 may determine one or more FSM parameters for the next bin of the bin stream. Entropy encoding unit 218 may also determine, based on the state for the respective bin, the one or more FSM parameters for the next bin of the bin stream, and the value of the respective bin, a state for the next bin of the bin stream. In this example, the offset value may be equal to a value in the interval for a last bin of the bin stream. Video encoder 20 may output a bitstream comprising the offset value.

Furthermore, in accordance with one or more techniques of this disclosure, entropy decoding unit 300 of video decoder 30 may determine a decoded syntax element by applying binary arithmetic decoding to an offset value included in a bitstream. As part of applying the binary arithmetic decoding, entropy decoding unit 300 may generating a bin stream. As part of generating the bin stream, entropy decoding unit 300 may, for at least one respective bin of the bin stream (e.g., a particular bin of the bin stream, each bin of the bin stream, each bin of the bin stream other than a last bin of the bin stream, etc.) determine, based on a state for the respective bin, an interval for the respective bin, and the offset value, a value of the respective bin. Additionally, entropy decoding unit 300 may determine one or more FSM parameters for a next bin of the bin stream. The next bin of the bin stream follows the respective bin in the bin stream. Furthermore, entropy decoding unit 300 may determine, based on the state for the respective bin, the one or more FSM parameters for the next bin of the bin stream, and the value of the respective bin, a state for the next bin of the bin stream. Entropy decoding unit 300 may debinarize the bin stream to form the decoded syntax element. Other components of video decoder 30 may reconstruct a picture of the video data based in part on the decoded syntax element. In other words, video decoder 30 may use the decoded syntax element in a process to reconstruct the picture.

In some examples, FSM parameter determination units 712, 812 use different functions for different contexts. For instance, each context may use a different function in FSM parameter determination units 712, 812. FSM parameter determination units 712, 812 use the function for a context to determine the FSM parameters used by bin probability estimation FSM units 708, 808. For instance, each of FSM parameter determination units 712, 812 may access a predefined table that maps different contexts to different FSM parameters. In another example, different contexts may be associated with different predefined tables. In this example, each of FSM parameter determination units 712, 812 may access the predefined table associated with a current context and look up an entry in the predefined table associated with the current context based on one or more additional pieces of information. In this example, the additional pieces of information may include information regarding coding modes of neighboring blocks, information regarding a position of a last non-zero coefficient, and so on. In some examples, the function for a context is a mapping from the context to predetermined values of the FSM parameters. Thus, in some examples, each of FSM parameter determination units 712, 812 is configured with a table that maps contexts to predetermined values of the FSM parameters.

In some examples, even for the same context, the FSM parameters (e.g., (a, b) for the two-track arithmetic coder) may also be dependent on slice types and/or quantization parameters, and/or coded mode information (e.g., any type of information that is coded as side information to the decoder, for example, in a slice header). For example, each of FSM parameter determination units 712, 812 may be configured with a table that maps combinations of factors (e.g., context, slice types, quantization parameters, coded mode information, etc.) to FSM parameters.

FSM parameter determination units 712, 812 may modify FSM parameters in various ways. In other words, FSM parameter determination units 712, 812 may change which FSM parameters are used by bin probability estimation FSM unit 708 in response to various events and based on various types of information. Some possibilities are listed below, which may be applicable for each context.

In one example, FSM parameters are modified during re-initialization according to a state re-initialization parameter, such as a quantization step or QP value. For example, a video coder may be configured with a predefined table that maps values of the state reinitialization parameter to FSM parameters. In this example, the video coder may use the table to look up FSM parameters based on the state reinitialization parameters.

In some examples, FSM parameters are modified according to estimated probability values, during re-initialization, or at periodic intervals shorter than re-initialization (e.g., for each CTU, after each bin, etc.). For example, a video coder may be configured with a predefined table that maps estimated probability values to FSM parameters. In this example, the video coder may use the table to look up FSM parameters based on the estimated probability values. In this example, the video coder may use the table to look up the FSM parameters during context reinitialization. For instance, the video coder may use the probability estimates specified by a coding context to look up FSM parameters during context reinitialization. Furthermore, in some examples, bin probability estimation FSM units 708 or 808 may determine probability estimates for bins that follow a first bin after context reinitialization. In such examples, the video coder may use the probability estimates determined by bin probability estimation FSM units 708 or 808 to look up the FSM parameters in the predefined table.

In some examples, FSM parameters are modified based on a measure of past probability variation. A video coder may compute the measure of past probability variation by summing the absolute differences between probabilities. In different examples, the video coder may estimate the probabilities using different techniques. In one example, using the FSM defined by equation (4), a video coder may use an "estimation variation measure" for determining FSM parameters. In this example, the "estimation variation measure" may be defined according to the following equation:

$$\sigma[k+1] = \sigma[k] + \left\lfloor \frac{|q_1[k] - q_2[k]| - \sigma[k]}{2^c} \right\rfloor, \quad (5)$$

Figure 9A:
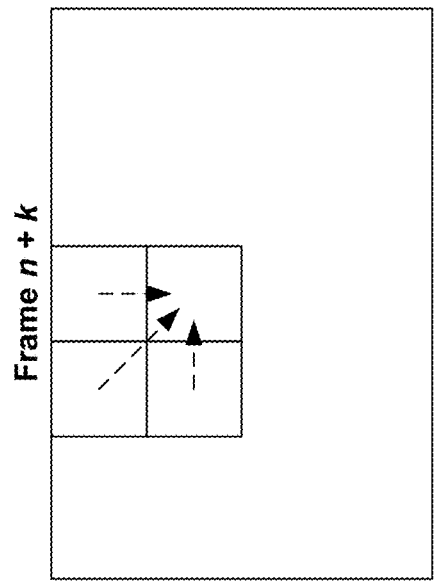
FIGS. 9A and 9B are block diagrams illustrating context-based encoding and decoding.
Figure 9A:
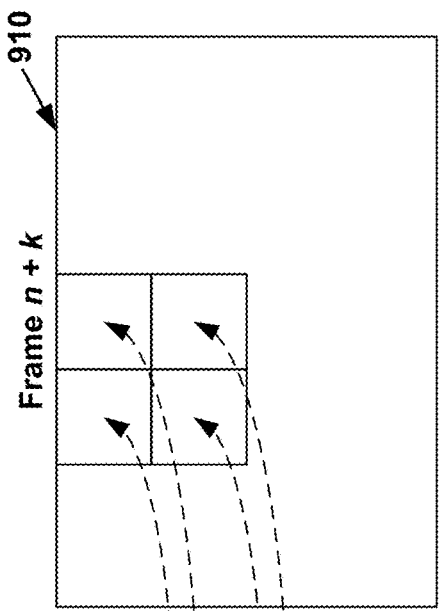

In the equation above, σ[k+1] is the estimation variation measure for bin k+1, σ[k] is the estimation variation measure for bin k, $q_1[k]$ and $q_2[k]$ are defined in equation (4), and c is a parameter (e.g., c may be a constant). In this example, the video coder may access a predefined table that maps different values of the estimation variation measure σ[k] to different sets of FSM parameters. Thus, in this example, the video coder may use the table to look up the FSM parameters based on the estimation variation measure. In some examples, the video coder may access different predefined tables for different coding contexts. In such examples, different entries in the predefined table for a coding context may map different values of σ[k] to values of the FSM parameters. In some examples where the video coder accesses different predefined tables for different coding contexts, different entries in the table for a coding context may map different combinations of values of σ[k] and additional information to values of FSM parameters. In such examples, the additional information may include slice types, quantization parameters, and so on, In some examples, a video coder may use any of the techniques as defined above for modifying the FSM parameters, but instead of using data generated since a previous re-initialization, a video coder may use data from other parts of a video sequence. For example, FIG. 9A is a block diagram showing that FSM parameters can be derived from neighboring blocks (e.g., CTUs, CUs) in the same picture following a scan order. For instance, in the example of FIG. 9A, FSM parameter determination units 712, 812 may determine FSM parameters based at least in part on information from one or more neighboring blocks. The information may include prediction modes, quantization parameters, and so on. In some examples, the information may include data derived from some measure of the probability variability. For example, a single bit can be used, with 1 to represent that significant changes in probability estimates were observed, and 0 to indicate otherwise.

Figure 9B:
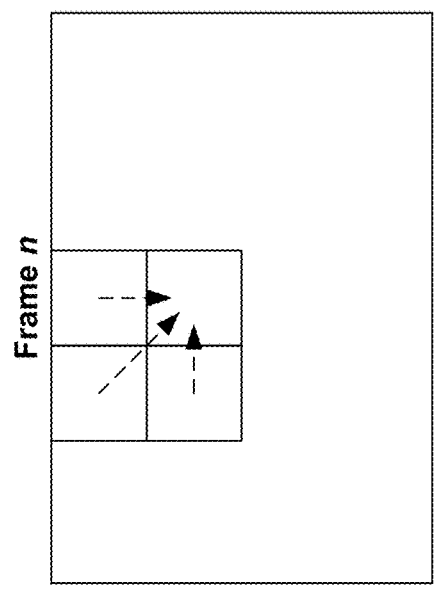
Figure 9B:
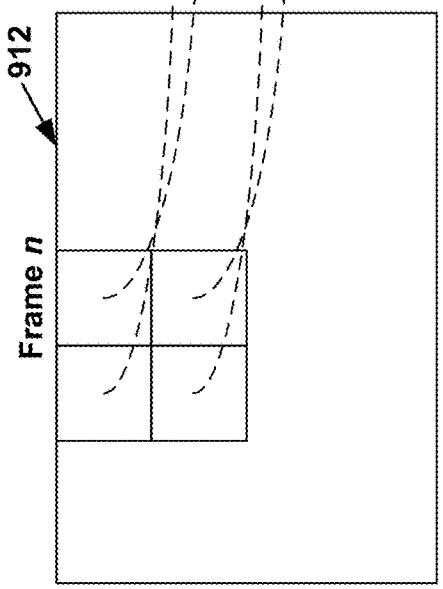

FIG. 9B is a block diagram showing that FSM parameters used in blocks of a current picture 910 can be determined based on information associated with blocks in a previously coded picture 912. The blocks in previously coded picture 912 may have the same spatial location as the blocks in current picture 910. For instance, in the example of FIG. 9B, FSM parameter determination units 712, 812 may determine FSM parameters based at least in part on information from one or more blocks in a previously coded picture. The information may include prediction modes, quantization parameters, and so on. In some examples, the information may include data derived from some measure of the probability variability. For example, a single bit can be used, with 1 to represent that significant changes in probability estimates were observed, and 0 to indicate otherwise.

The techniques introduced above exploit two main ideas for improving the process of estimating probabilities. First, the counter-based techniques discussed in Reference 15 and A. Alshin and E. Alshina, "Method and apparatus for entropy encoding/decoding,", US Patent Application Publication 2014/0177708 A1, June 2014 ("Reference 19"), herein incorporated by reference in its entirety, exploit the fact that probability estimation (using the equations defined in the previous section) tend to improve as the number of encoded/decoded bin increases. Thus, it may be better to start with a parameter that defines faster, but less accurate estimation, and then switch to parameters that define slower, but more accurate estimation. Second, the use of different sets of parameters per encoding/decoding context, as introduced above, exploits the fact that different syntax elements produce streams of bins with distinct statistical characteristics, and it is better to use parameters optimized for each case.

This disclosure also extends the techniques introduced above by combining the two ideas above but extending the first idea to also include: (i) using a counter for encoded/decoded bins per context, (ii) allowing a measure of estimation "progress" or "maturity" to provide adaptation, and (iii) introducing more general ways of changing the adaptation parameters according to that measure.

This disclosure describes techniques for probability estimation in binary arithmetic coding with progressive adaptation, which potentially provides a better adaptation for probability estimates and improves coding efficiency as compared to the techniques of References 15 and 19. The techniques for probability estimation in binary arithmetic coding with progressive adaptation include two main components, as shown in the examples of FIGS. 11A and 11B. The first component is probability estimation. According to the techniques of this disclosure, the probability updates are performed in a two-step estimation as in (2)-(4). However, the techniques of this disclosure can be more general and use n positive weights, denoted as $w_1, w_2 \ldots, w_n$, for probability updates formulated as follows:

Probability Estimator ($w_1, w_2 \ldots, w_n$):

$$q_i[k+1] = q_i[k] + \left\lfloor \frac{2^{15} b[k] - q_i[k]}{w_i} \right\rfloor \text{ for } i = 1, 2, \ldots n. \quad (5)$$

$$p[k+1] = \left\lfloor \frac{q_1[k+1] + q_2[k+1] + \ldots + q_n[k+1]}{n} \right\rfloor. \quad (6a)$$

$$p[k+1] = \left\lfloor \frac{a_1 * q_1[k+1] + a_2 * q_2[k+1] + \ldots + a_n * q_n[k+1]}{\sum_{i=1}^{n} a_i} \right\rfloor. \quad (6b)$$

where $a_i$ is predefined integer.

The second component is progressive adaptation. The proposed progressive adaptation of this disclosure specifies the parameters (i.e., weights $w_1, w_2 \ldots, w_n$ and $a_1, a_2 \ldots, a_n$) of the probability estimator adaptively throughout the encoding (or decoding) process. For this purpose, a measure of progression, denoted as t, is used to determine the weights used in the probability estimator. In a general setting, the weights are selected as a vector valued function of t, that is, $(w_1, w_2, \ldots, w_n) = f(t)$ where t measures the degree of progression. Examples of a such measure include (i) number of previously encoded/decoded bins, (ii) position of the next video patch (e.g., CTU block, slice or coding unit) to be encoded/decoded, and (iii) number of pixels that are previously encoded/decoded.

This disclosure also describes additional techniques that build upon the techniques already introduced above. Accordingly, unless explicitly stated otherwise, it should be assumed that all of the conditions specified for changing probability estimation parameters, such as binary encoding or decoding of context (compressed data syntax element), can be combined with the measures of "progress" or "maturity" of the probability estimation defined below.

This disclosure describes the following techniques for measuring estimation progress. Video encoder 20 and video decoder 30 may be configured to perform any combination of the below techniques. In some examples, video decoder 30 may perform a technique that this reciprocal to that of video encoder 20.

1. Using one or more counter of encoded/decoded bins per context, with changes of multiple parameters defined by one or more threshold values, denoted by $T_1$, $T_2 \ldots$ (Reference 19 defines only one parameter and threshold, and does not include other factors described above).
   a. The total number of sets of parameters for each context may be equal to the total number of threshold plus 1.
   b. In one example, each set of parameters for each context corresponding to counter smaller or equal than one threshold may be predefined.
   c. In another example, one set of parameters for each context corresponding to counter smaller or equal than one threshold (e.g., $T_1$) may be derived from another set of parameters corresponding to counter smaller or equal than one threshold (e.g., $T_2$). In this case, the storage of parameters may be reduced.
      (a) In one example, for a given context, assume the values of parameters (a, b) corresponding to counter smaller or equal than $T_1/T_2$ denoted by (A1, B1) and (A2, B2) respectively wherein A2 may be set to (A1<<1) and/or B2 set to (B1<<1).
2. Adding one or more counter of encoded/decoded bins per context, but instead of using the counter for immediately changing adaptation parameters, only changing parameters of multiple context (using thresholds defined for each context) when an external condition occurs. Examples of external condition include:
   a. Start or end of a coding unit (CTU)
   b. Start or end of a pre-defined group of coding units, e.g., N consecutively coded CTUs, where N is pre-defined
   c. Start or end of a CTU row
   d. Start of a slice/tile, and depending if temporal probability updates are used on that slice.
   e. Any other block position defined for both encoder and decoder. The block position can be fixed or be changed depending on the bins statistics, or signaled.
   f. If wavefront processing (e.g., wavefront parallel processing) is used, the external condition can be block position at which CABAC initialization is borrowed for the next CTU row.
   g. In one example, the external condition could be the same for all contexts. In other examples, different external condition may be applied for different contexts.
3. Substitute one counter on each context with external indicator, like a combination of the following
   a. the number of encoded/decoded pixels;
   b. the average number of encoded/decoded bins per pixel
   c. accumulated bit rate
   d. temporal update of probability estimators
   e. video slice quality factor (e.g., QP value) and slice type (I, B, or P) and temporal layer (temporal layer 0, 1, or 2)
   f. In one example, the external condition could be the same for all contexts. In other examples, different external condition may be applied for different contexts.
4. The introduced counter may be borrowed with the CABAC initialization from the upper CTU row, when wavefront processing is enabled. In other examples, the counter can be reset and accumulation can start from the beginning when CABAC initialization is borrowed during wavefront parallel processing. In yet another example, during wavefront processing the weights that are used are stored at a synchronization point and are borrowed along the probability initialization, in this case counter information may not be needed for the next CTU rows.
5. The proposed techniques mentioned above may be applied to certain contexts.

In practice, calculation of n updates in (5) and then averaging them as in (6) may be computationally complex and require significant memory resources, especially when n is a large number. As a specific example of the probability estimator, the choices of weights may be restricted to n=2 with $w_1=2^a$ and $w_2=2^b$ where a and b are two positive integers. This restriction allows efficient implementation of multiplications with $w_1$ and $w_2$ using bit-shifts, so that the technique has a lower computational complexity. In this case, the relations in (5) and (6) can be explicitly written as follows:

$$q_1[k+1] = q_1[k] + \left\lfloor \frac{2^{15}b[k] - q_1[k]}{2^a} \right\rfloor, \quad (8)$$

$$q_2[k+1] = q_2[k] + \left\lfloor \frac{2^{15}b[k] - q_2[k]}{2^b} \right\rfloor, \quad (9)$$

$$p[k+1] = \left\lfloor \frac{q_1[k+1] + q_2[k+1]}{2} \right\rfloor. \quad (10)$$

Moreover, an arbitrary choice of the function $(w_1, w_2) = f(t)$ may lead to high memory and computational complexities. In order to alleviate this issue, $(w_1, w_2) = f(t)$ can be selected as a piecewise-constant function where a set of fixed pair of numbers can be assigned to a set of intervals. An example of such function can be as $$(w_1, w_2) = f(t) = \begin{cases} (2^3, 2^5) & \text{for } t \in [0, T_1) \\ (2^5, 2^6) & \text{for } t \in [T_1, T_2) \\ (2^8, 2^9) & \text{for } t \in (T_2, \infty) \end{cases} \quad (11)$$

where $T_1$ and $T_2$ are two threshold values that determine the intervals of the piecewise function. Moreover, to obtain better compression performance, the probability updates can be done on a per-context basis. For this purpose, a set of weight pairs $(w_1^{(c)}, w_2^{(c)})$ and the set of thresholds $T_1^{(c)}$ and $T_2^{(c)}$ can be optimized for each context, denoted as c, and used for adaptive probability estimation in an encoder or decoder. Such class-based adaptation can be applied for any pre-determined classes of bins where class definitions can be based on any side information available in the encoder/decoder, such as slice types and quantization parameters (e.g., QP values).

The adaptation parameters can be changed based on, for example,
1. Independently per context
2. Simultaneously for all contexts;
3. Simultaneously for a pre-defined group of contexts, and fixed for the rest.

Figure 12:
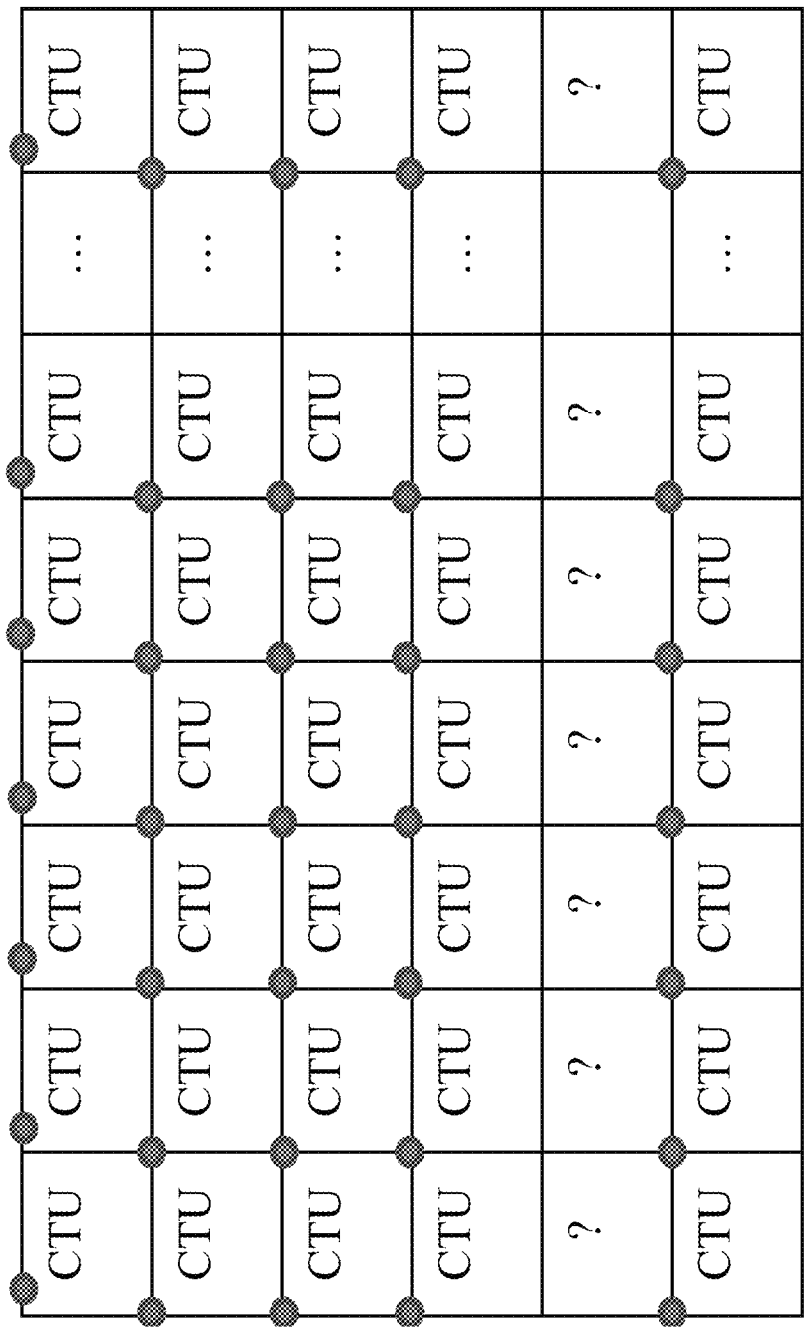
FIG. 12 shows an example definition of "check points" (the dots) in a video slice, when all probability estimation parameters can be simultaneously updated.

The condition for changing the context can also be based on any information shared by the encoder and decoder. For example, FIG. 12 shows a video slice (which can be a video frame), which is organized into CTU's which are independently coded. One example of implementation is to have context estimation parameters updated only at the beginning of those blocks, and not inside. The change can be based on counters kept by each context, or information that aggregates coding data, like the current number of compressed data bytes in the slice.

Figure 13:
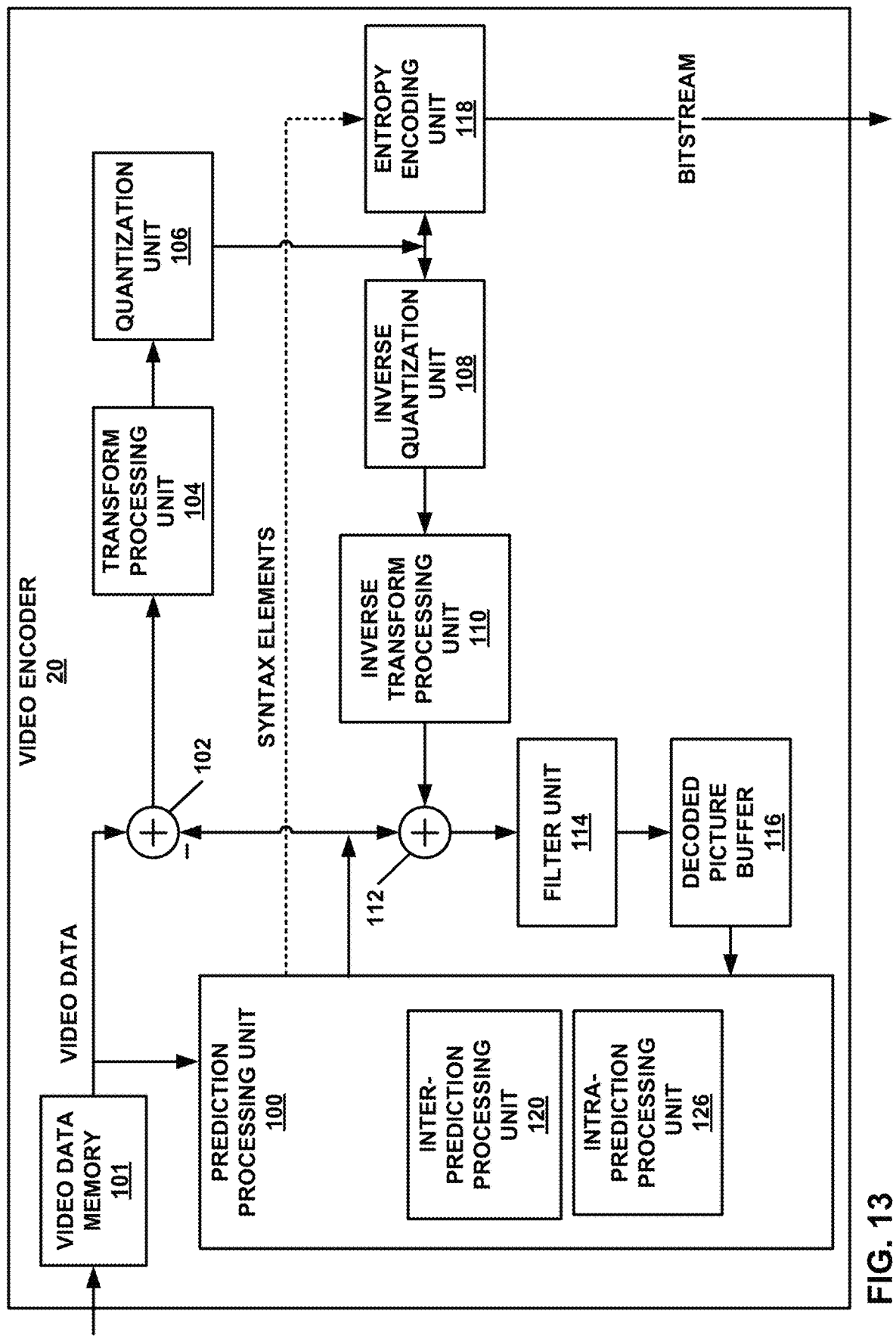
FIG. 13 is a block diagram illustrating an example video encoder that may implement one or more techniques described in this disclosure.

FIG. 13 is a block diagram illustrating an example video encoder 20 that may implement the techniques of this disclosure. FIG. 13 is provided for purposes of explanation and should not be considered limiting of the techniques as broadly exemplified and described in this disclosure. The techniques of this disclosure may be applicable to various coding standards or techniques.

Processing circuitry includes video encoder 20, and video encoder 20 is configured to perform one or more of the example techniques described in this disclosure. For instance, video encoder 20 includes integrated circuitry, and the various units illustrated in FIG. 13 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 13 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 13, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRA \4), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 20 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

In some examples, techniques of this disclosure may be implemented using entropy encoding unit 118. For example, video encoder 20 may receive video data. The video data may comprise one or more pictures. Furthermore, prediction processing unit 100, quantization unit 106, and potentially other components of video encoder 20 may generate syntax elements based on the video data. In this example, entropy encoding unit 118 may determine an offset value by applying binary arithmetic encoding to one of the generated syntax elements. As part of applying the binary arithmetic encoding, entropy encoding unit 118 may generate a bin stream by binarizing the syntax element. Furthermore, for at least one respective bin of the bin stream (e.g., a particular bin of the bin stream, each bin of the bin stream, each bin of the bin stream other than a last bin of the bin stream, etc.), entropy encoding unit 118 may determine, based on a state for the respective bin, an interval for the respective bin, and a value of the respective bin, an interval for a next bin of the bin stream. Additionally, entropy encoding unit 118 may determine one or more Finite State Machine (FSM) parameters for the next bin of the bin stream. Entropy encoding unit 118 may also determine, based on the state for the respective bin, the one or more FSM parameters for the next bin of the bin stream, and the value of the respective bin, a state for the next bin of the bin stream. In this example, the offset value may be equal to a value in the interval for a last bin of the bin stream. Video decoder 30 may output a bitstream comprising the offset value.

Figure 14:
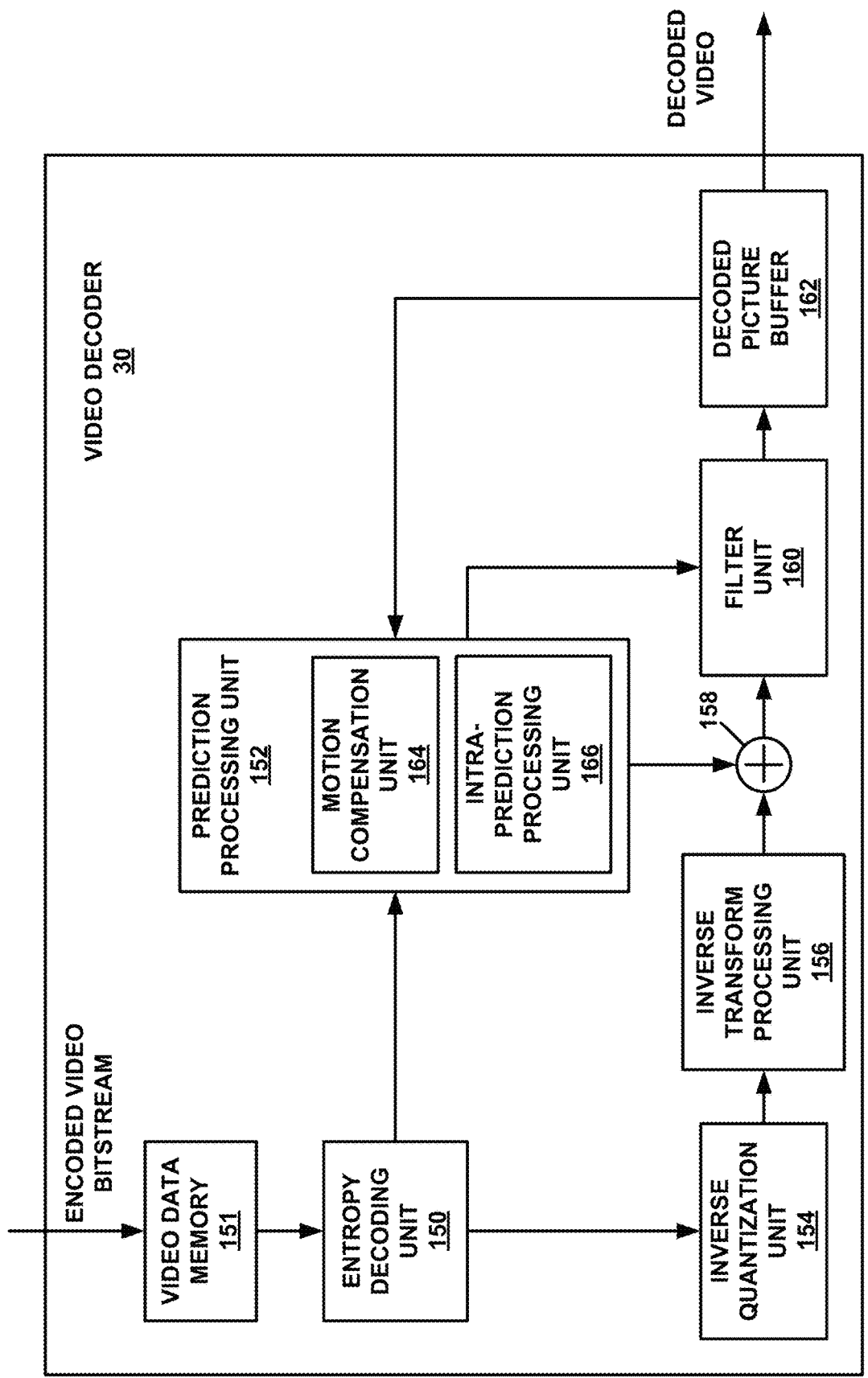
FIG. 14 is a block diagram illustrating an example video decoder that may implement one or more techniques described in this disclosure.

FIG. 14 is a block diagram illustrating an example video decoder 30 that is configured to implement the techniques of this disclosure. FIG. 14 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or used in conjunction with other coding tools.

Processing circuitry includes video decoder 30, and video decoder 30 is configured to perform one or more of the example techniques described in this disclosure. For instance, video decoder 30 includes integrated circuitry, and the various units illustrated in FIG. 14 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 14 may include software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 14, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

Techniques of this disclosure may be implemented using entropy decoding unit 150. For example, entropy decoding unit 150 may determine a decoded syntax element by applying binary arithmetic decoding to an offset value included in a bitstream. As part of applying the binary arithmetic decoding, entropy decoding unit 150 may generating a bin stream. As part of generating the bin stream, entropy decoding unit 150 may, for at least one respective bin of the bin stream (e.g., a particular bin of the bin stream, each bin of the bin stream, each bin of the bin stream other than a last bin of the bin stream, etc.) determine, based on a state for the respective bin, an interval for the respective bin, and the offset value, a value of the respective bin. Additionally, entropy decoding unit 150 may determine one or more FSM parameters for a next bin of the bin stream, the next bin of the bin stream following the respective bin in the bin stream. Furthermore, entropy decoding unit 150 may determine, based on the state for the respective bin, the one or more FSM parameters for the next bin of the bin stream, and the value of the respective bin, a state for the next bin of the bin stream. Entropy decoding unit 150 may debinarize the bin stream to form the decoded syntax element. Other components of video decoder 30 may reconstruct a picture of the video data based in part on the decoded syntax element. In other words, video decoder 30 may use the decoded syntax element in a process to reconstruct the picture.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 15A:
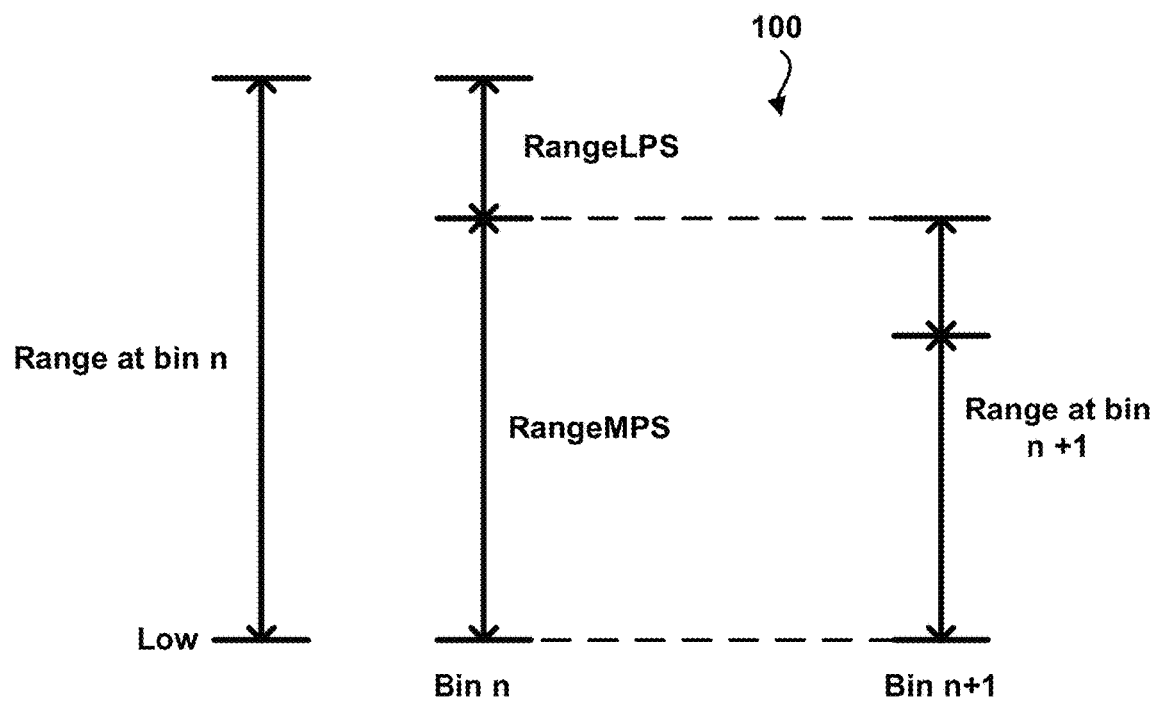
FIGS. 15A and 15B are conceptual diagrams illustrating a range update process in binary arithmetic coding.
Figure 15B:
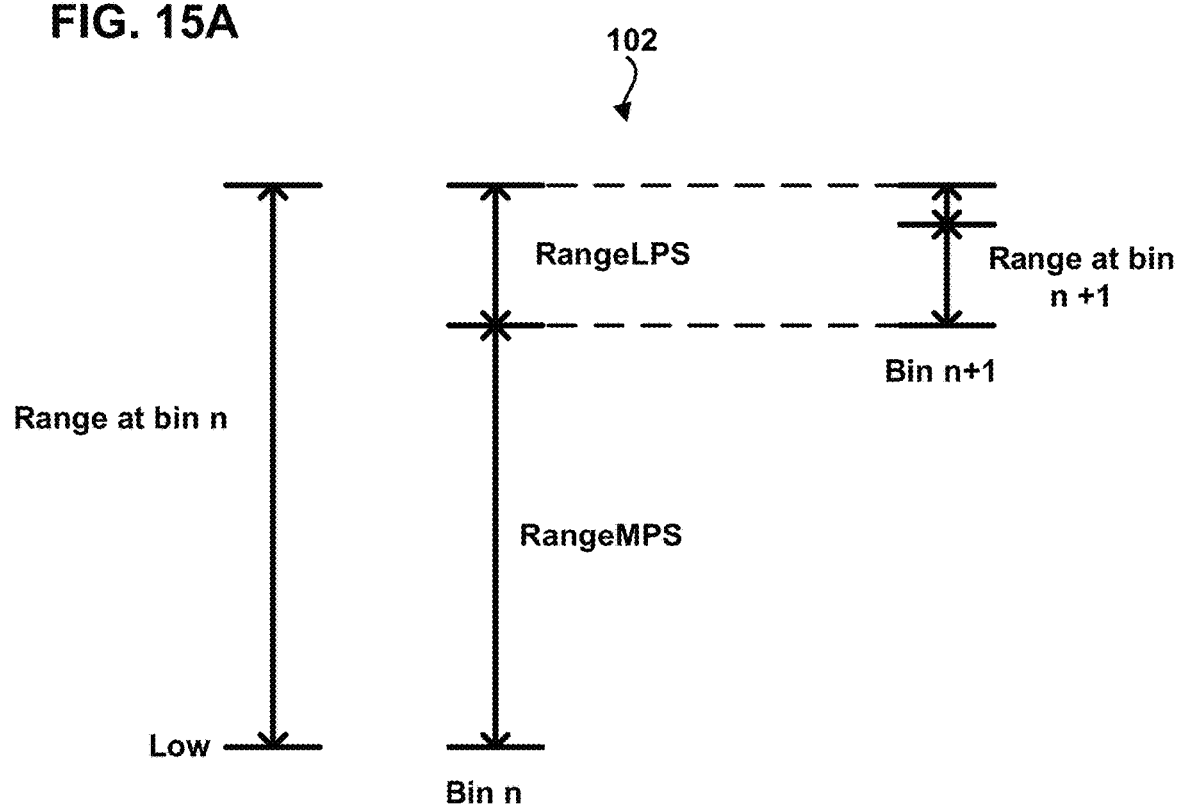

FIGS. 15A and 15B show examples of a CABAC process at a bin n. In example 400 of FIG. 15A, at bin n the range at bin 2 includes the RangeMPS and RangeLPS given by the probability of the least probable symbol (LPS) ($p_o$) given a certain context state ($\sigma$). Example 400 shows the update of the range at bin n+1 when the value of bin n is equal to the most probable symbol (MPS). In this example, the low stays the same, but the value of the range at bin n+1 is reduced to the value of RangeMPS at bin n. Example 402 of FIG. 15B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 16:
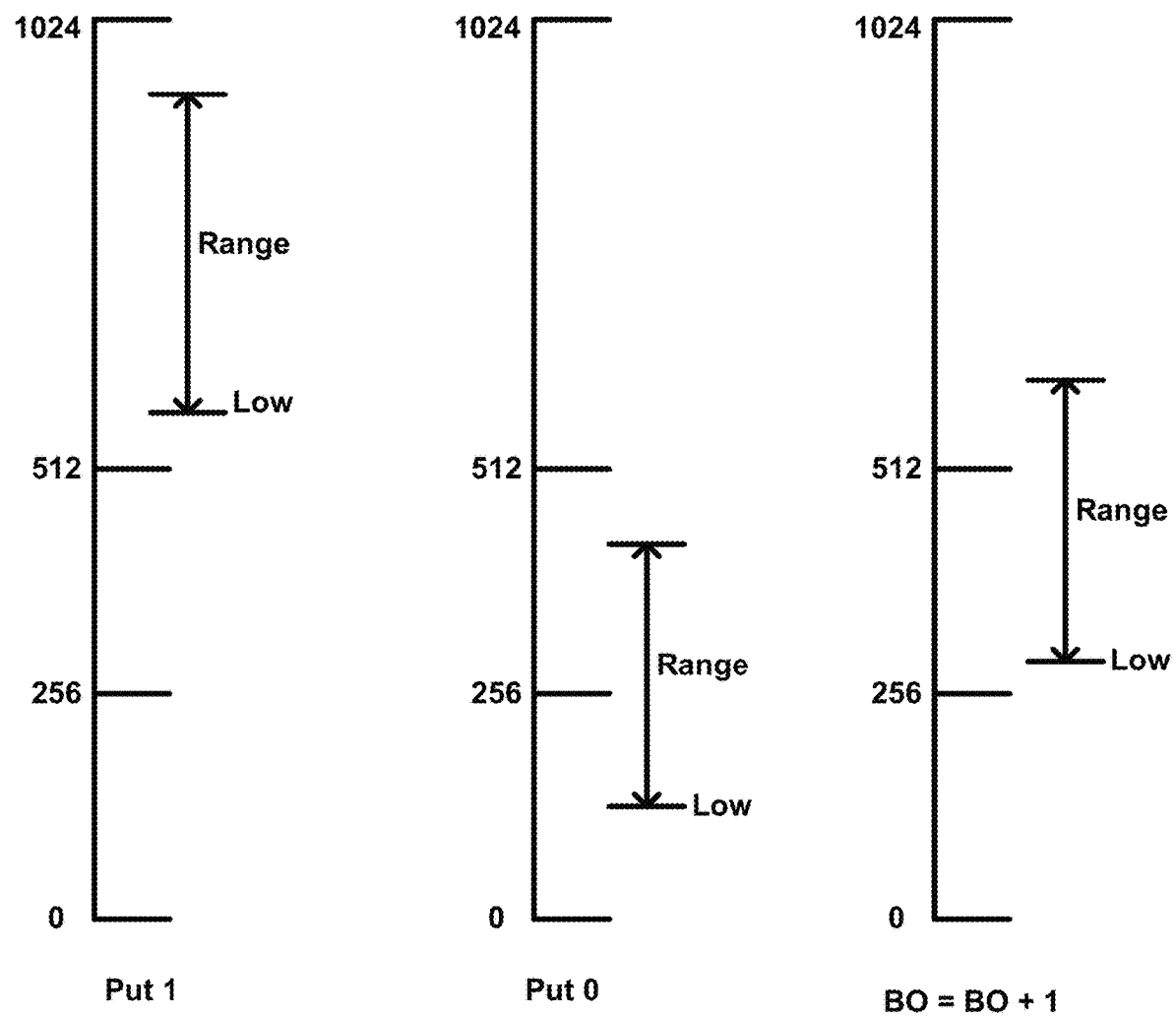
FIG. 16 is a conceptual diagram illustrating an output process in binary arithmetic coding.

In one example of the HEVC video coding process, range is expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the binary arithmetic coder (BAC) outputs to the bitstream, a '0,' or a '1,' or updates an internal variable (called BO: bits-outstanding) to keep for future outputs. FIG. 16 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

In the CABAC context model of H.264/AVC and in some examples of HEVC, there are 128 states. There are 64 possible LPS probabilities (denoted by state $\sigma$) that can be from 0 to 63. Each MPS can be zero or one. As such, the 128 states are 64 state probabilities times the 2 possible values for MPS (0 or 1). Therefore, the state can be indexed with 7 bits.

To reduce the computation of deriving LPS ranges (rangeLPS$_\sigma$), results for all cases may be pre-calculated and stored as approximations in a look-up table. Therefore, the LPS range can be obtained without any multiplication by using a simple table lookup. Avoiding multiplication can be important for some devices or applications, since this operation may cause significant latency in many hardware architectures.

A 4-column pre-calculated LPS range table may be used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

| Range Index | | | | |
|---|---|---|---|---|
| | Range | | | |
| | 256-319 | 320-383 | 384-447 | 448-511 |
| (range >> 6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63.

TABLE 2

| | RangeLPS | | | |
|---|---|---|---|---|
| Prob State ($\sigma$) | Index 0 | Index 1 | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state, is pre-defined. In other words, the LPS range of a probability state, is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. The probability p for each state is derived as follows:

$$p_\sigma = \alpha p_{\sigma-1}$$

where the state $\sigma$ is from 0 to 63. The constant $\alpha$ represents the amount of probability change between each context state. In one example, $\alpha$=0.9493, or, more precisely, $\alpha=(0.01875/0.5)^{1/63}$. The probability at state $\sigma$=0 is equal to 0.5 (i.e., $p_0=½$). That is, at context state 0, the LPS and MPS are equally probable. The probability at each successive state is derived by multiplying the previous state by $\alpha$. As such, the probability of the LPS occurring at context state $\alpha$=1 is $p_0$*0.9493 (0.5*0.9493=0.47465). As such, as the index of state $\alpha$ increases, the probability of the LPS occurring goes down.

CABAC is adaptive because the probability states are updated in order to follow the signal statistics (i.e., the values of previously coded bins). The update process is as follows. For a given probability state, the update depends on the state index and the value of the encoded symbol identified either as an LPS or an MPS. As a result of the updating process, a new probability state is derived, which consists of a potentially modified LPS probability estimate and, if necessary, a modified MPS value.

In the event of a bin value equaling the MPS, a given state index may be incremented by 1. This is for all states except when an MPS occurs at state index 62, where the LPS probability is already at its minimum (or equivalently, the maximum MPS probability is reached). In this case, the state index 62 remains fixed until an LPS is seen, or the last bin value is encoded (state 63 is used for the special case of the last bin value). When an LPS occurs, the state index is changed by decrementing the state index by a certain amount, as shown in the equation below. This rule applies in general to each occurrence of a LPS with the following exception. Assuming a LPS has been encoded at the state with index $\sigma$=0, which corresponds to the equi-probable case, the state index remains fixed, but the MPS value will be toggled such that the value of the LPS and MPS will be interchanged. In all other cases, no matter which symbol has been encoded, the MPS value will not be altered. The derivation of the transition rules for the LPS probability is based on the following relation between a given LPS probability $p_{old}$ and its updated counterpart $p_{new}$:

$$p_{new} = \max(\alpha p_{old}, p_{62}) \text{ if a MPS occurs}$$

$$p_{new} = (1-\alpha) + \alpha p_{old} \text{ if a LPS occurs}$$

With regard to a practical implementation of the probability estimation process in CABAC, it is important to note that all transition rules may be realized by at most two tables each having 63 entries of 6-bit unsigned integer values. In some examples, state transitions may be determined with a single table TransIdxLPS, which determines, for a given state index $\sigma$, the new updated state index TransIdxLPS [$\sigma$] in case an LPS has been observed. The MPS-driven transitions can be obtained by a simple (saturated) increment of the state index by the fixed value of 1, resulting in an updated state index min($\sigma$+1, 62). Table 3 below is an example of a partial TransIdxLPS table.

TABLE 3

| TransIdxLPS | |
|---|---|
| Prob State ($\sigma$) | New State TransIdxLPS [$\sigma$] |
| ... | ... |
| 9 | 6 |
| 10 | 8 |
| 11 | 8 |
| 12 | 8 |
| ... | ... |

The techniques described above with respect to FIGS. 15A, 15B, and 16 merely represent one example implementation of CABAC. It should be understood that the techniques of this disclosure are not limited only to this described implementation of CABAC. For example, in older BAC approaches (e.g., the BAC approach used in H.264/AVC), the tables RangeLPS and TransIdxLPS were tuned for low resolution videos, (i.e., common intermediate format (CIF) and quarter-CIF (QCIF) videos). With HEVC and future codecs such as VVC, a large amount of video content is high definition (HD) and, in some cases, greater than HD. Video content that is HD or greater than HD resolution tends to have different statistics than the 10-year-old QCIF sequences used to develop H.264/AVC. As such, the tables RangeLPS and TransIdxLPS from H.264/AVC may cause adaptation between states in a manner that is too quick. That is, the transitions between probability states, especially when an LPS occurs, can be too great for the smoother, higher resolution content of HD video. Thus, the probability models used according to conventional techniques may not be as accurate for HD and extra-HD content. In addition, as HD video content includes a greater range of pixel values, the H.264/AVC tables do not include enough entries to account for the more extreme values that may be present in HD content.

As such, for HEVC and for future coding standards such as VVC, the RangeLPS and TransIdxLPS tables may be modified to account for the characteristics of this new content. In particular, the BAC processes for HEVC and future coding standards may use tables that allow for a slower adaptation process and may account for more extreme cases (i.e., skewed probabilities). Thus, as one example, the RangeLPS and TransIdxLPS tables may be modified to achieve these goals by including more probability states and ranges than used in BAC with H.264/AVC or HEVC.

Figure 17:
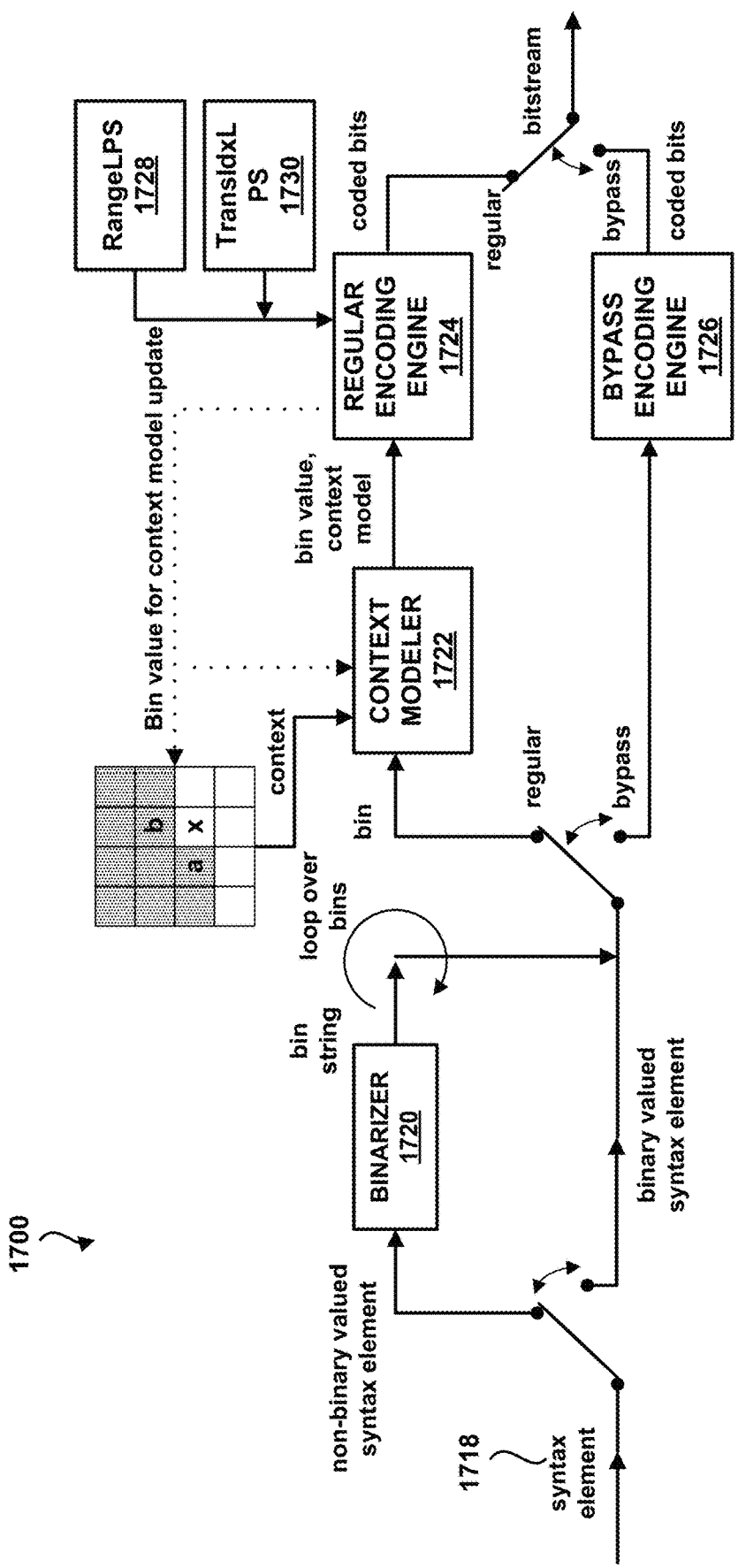
FIG. 17 is a block diagram illustrating a context adaptive binary arithmetic coder in a video encoder.

FIG. 17 is a block diagram of an example entropy encoding unit 1700 that may be configured to perform CABAC in accordance with the techniques of this disclosure. Entropy encoding unit 1700 may, for example, correspond to or be a component of entropy encoding unit 118 of FIG. 13. A syntax element 1718 is input into the entropy encoding unit 1700. If the syntax element is already a binary-value syntax element (i.e., a syntax element that only has a value of 0 and 1), the step of binarization may be skipped. If the syntax element is a non-binary valued syntax element (e.g., a syntax element represented by multiple bits, such as transform coefficient levels), the non-binary valued syntax element is binarized by binarizer 1720. Binarizer 1720 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 1720 is fed to the binary arithmetic coding side of entropy encoding unit 1700. That is, for a predetermined set of non-binary valued syntax elements, each bin type (e.g., bin 0) is coded before the next bin type (e.g., bin 1). Coding may be performed in either regular mode or bypass mode. In bypass mode, bypass coding engine 1726 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 1722. Context modeler 1722 outputs the bin value and the context model (e.g., the probability state σ). The context model may be an initial context model for a series of bins or may be determined based on the coded values of previously coded bins. As described above, the context modeler may update the state based on whether or not the previously-coded bin was an MPS or an LPS.

After the context model and probability state σ are determined by context modeler 1722, regular coding engine 1724 performs BAC on the bin value. According to the techniques of this disclosure, regular coding engine 1724 performs BAC using TransIdxLPS table 1730 that includes more than 64 probability states σ. In one example, the number of probability states is 128. TransIdxLPS is used to determine which probability state is used for a next bin (bin n+1) when the previous bin (bin n) is an LPS. Regular coding engine 1724 may also use a RangeLPS table 128 to determine the range value for an LPS given a particular probability state σ. However, according to the techniques of this disclosure, rather than using all possible probability states σ of the TransIdxLPS table 1730, the probability state indexes σ are mapped to grouped indexes for use in the RangeLPS table. That is, each index into the RangeLPS table 1728 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example, α=0.9689. In another example of the disclosure, the highest probability ($p_0$) of an LPS occurring may be set to be lower than 0.5. In one example, $p_0$ may be equal to 0.493.

In accordance with one or more techniques of this disclosure, as opposed to using the same value of a variable used to update a probability state in a binary arithmetic coding process (e.g., one or more of a window size, a scaling factor (a), and a probability updating speed), entropy encoding unit 1700 may use different values of the variable for different context models and/or different syntax elements. For instance, entropy encoding unit 1700 may determine, for a context model of a plurality of context models, a value of a variable used to update a probability state in a binary arithmetic coding process, and update the probability state based on the determined value.

Figure 18:
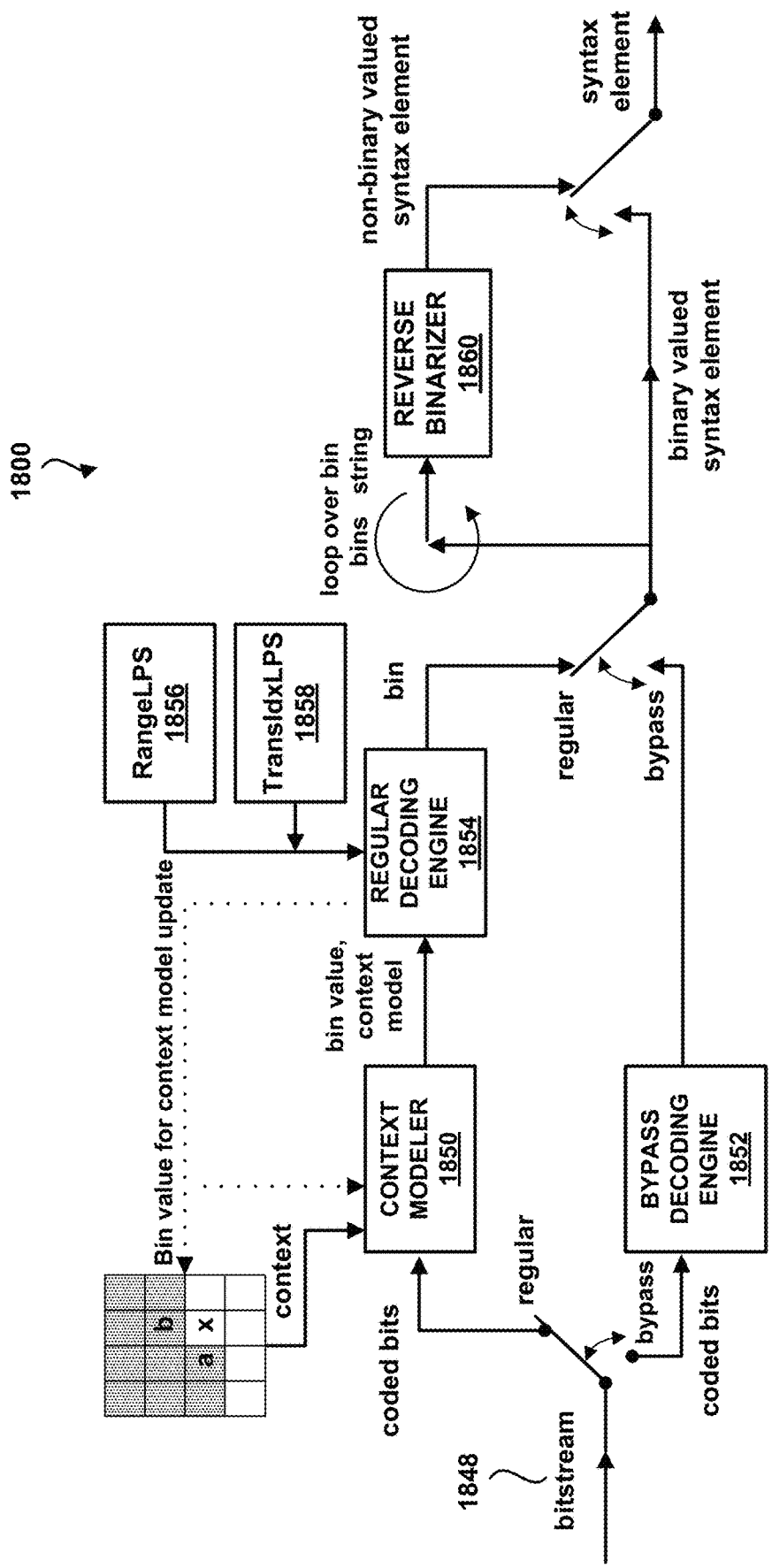
FIG. 18 is a block diagram illustrating a context adaptive binary arithmetic coder in a video decoder.

FIG. 18 is a block diagram of an example entropy decoding unit 1800 that may be configured to perform CABAC in accordance with the techniques of this disclosure. Entropy decoding unit 1800 may, for example, correspond to or be a component of entropy decoding unit 150 of FIG. 14. The entropy decoding unit 1800 of FIG. 18 performs CABAC in an inverse manner as that of entropy encoding unit 1700 described in FIG. 17. Coded bits from bitstream 1848 are input into entropy decoding unit 1800. The coded bits are fed to either context modeler 1850 or bypass coding engine 1852 based on whether or not the coded bits were entropy coded using bypass mode or regular mode. If the coded bits were coded in bypass mode, bypass decoding engine 1852 may, for example, use Golomb-Rice or exponential Golomb decoding to retrieve the binary-valued syntax elements or bins of non-binary syntax elements.

If the coded bits were coded in regular mode, context modeler 1850 may determine a probability model for the coded bits and regular decoding engine 1854 may decode the coded bits to produce bins of non-binary valued syntax elements (or the syntax elements themselves if binary-valued). After the context model and probability state σ is determined by context modeler 1850, regular decoding engine 1854 performs BAC on the bin value. According to the techniques of this disclosure, regular decoding engine 1854 performs BAC using TransIdxLPS table 1858 that includes more than 64 probability states σ. In one example, the number of probability states is 128, although other numbers of probability states could be defined, consistent with the techniques of this disclosure. TransIdxLPS table 1858 is used to determine which probability state is used for a next bin (bin n+1) when the previous bin (bin n) is an LPS. Regular decoding engine 1854 may also use a RangeLPS table 1856 to determine the range value for an LPS given a particular probability state σ. However, according to the techniques of this disclosure, rather than using all possible probability states σ of the TransIdxLPS table 1858, the probability state indexes σ are mapped to grouped indexes for use in RangeLPS table 1856. That is, each index into RangeLPS table 1856 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example, α=0.9689. In another example of the disclosure, the highest probability ($p_0$) of an LPS occurring may be set to be lower than 0.5. In one example, $p_0$ may be equal to 0.493.

After the bins are decoded by regular decoding engine 1854, a reverse binarizer 1860 may perform a reverse mapping to convert the bins back into the values of the non-binary valued syntax elements.

Figure 19:
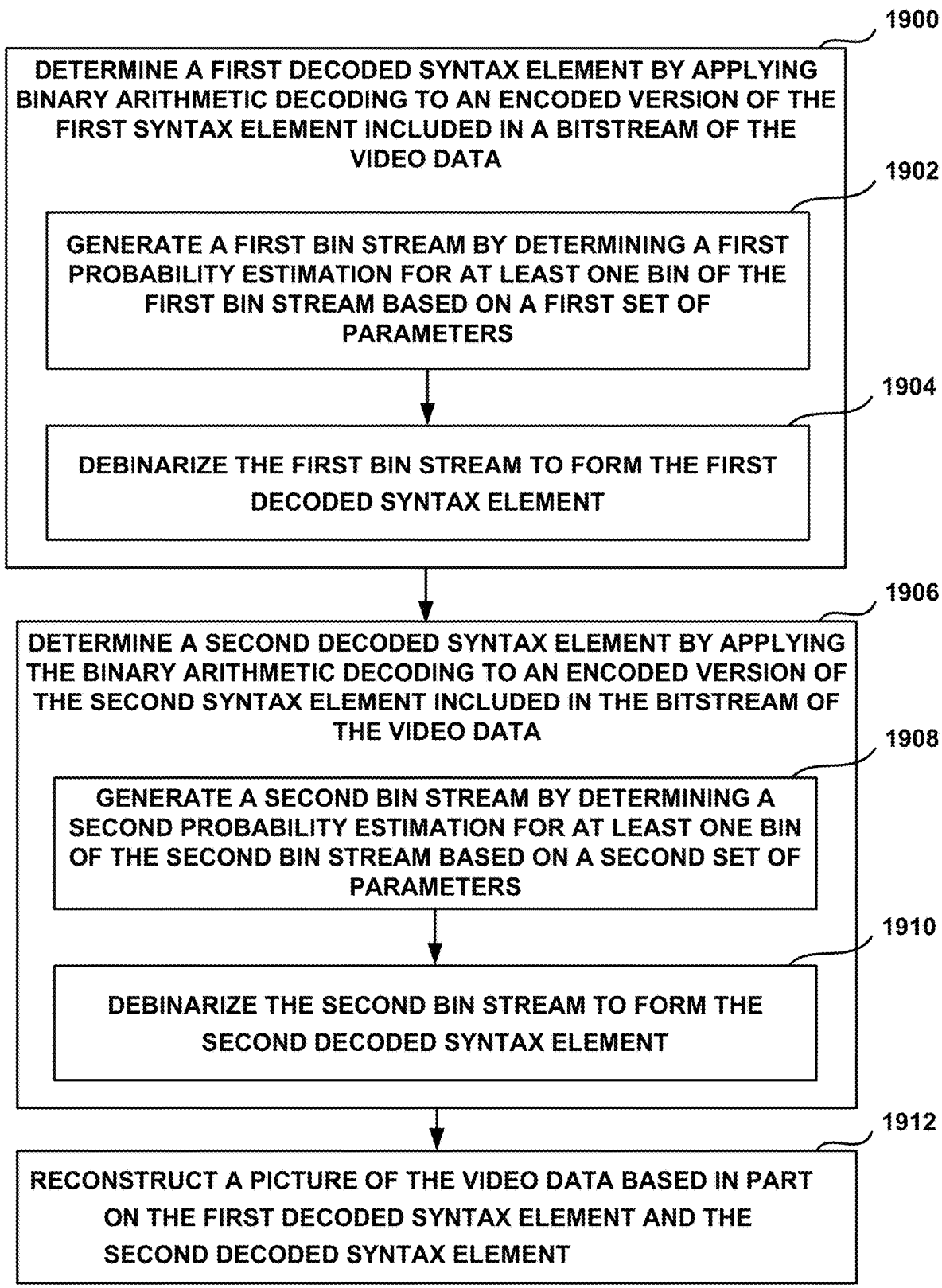
FIG. 19 is a flowchart showing an example video decoding process.

FIG. 19 is a flowchart showing an example process for decoding video data. The techniques of FIG. 19 may, for example, be performed by a video decoding device. The video decoding device may be or include any of video decoder 30, entropy decoding unit 150, entropy decoding unit, or various other components described above.

The video decoding device determines a first decoded syntax element by applying binary arithmetic decoding to an encoded version of the first syntax element included in a bitstream of the video data (1900). As part of determining a first decoded syntax element by applying binary arithmetic decoding to an encoded version of the first syntax element included in a bitstream of the video data, the video decoding device generates a first bin stream by determining a first probability estimation for at least one bin of the first bin stream based on a first set of parameters (1902) and debinarizes the first bin stream to form the first decoded syntax element (1904). The video decoding devices also determines a second decoded syntax element by applying the binary arithmetic decoding to an encoded version of the second syntax element included in the bitstream of the video data (1906). As part of applying the binary arithmetic decoding to the encoded version of the second syntax element, the video decoding device generates a second bin stream by determining a second probability estimation for at least one bin of the second bin stream based on a second set of parameters (1908) and debinarizes the second bin stream to form the second decoded syntax element (1910).). The second set of parameters comprises different parameters than the first set of parameters. The video decoding device also reconstructs a picture of the video data based in part on the first decoded syntax element and the second decoded syntax element.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining a first decoded syntax element by applying binary arithmetic decoding to an encoded version of the first syntax element included in a bitstream of the video data, wherein applying the binary arithmetic decoding to the encoded version of the first syntax element comprises:
        generating a first bin stream, wherein generating the first bin stream comprises determining a first probability estimation for at least one bin of the first bin stream based on a set of initial parameters;
        debinarizing the first bin stream to form the first decoded syntax element;
    determining a second decoded syntax element by applying the binary arithmetic decoding to an encoded version of the second syntax element included in the bitstream of the video data, wherein applying the binary arithmetic decoding to the encoded version of the second syntax element comprises:
        generating a second bin stream, wherein generating the second bin stream comprises determining a second probability estimation for at least one bin of the second bin stream based on a set of updated parameters, wherein the set of updated parameters comprises different parameters than the set of initial parameters, wherein determining the second probability estimation for the at least one bin of the second bin stream based on the set of updated parameters comprises determining the second probability estimation according to the equations:

$$q_i[k+1] = q_i[k] + \left\lfloor \frac{2^{15}b[k] - q_i[k]}{w_i} \right\rfloor \text{ for } i = 1, 2, \ldots n,$$

$$p[k+1] = \left\lfloor \frac{a_1 * q_1[k+1] + a_2 * q_2[k+1] + \ldots + a_n * q_n[k+1]}{\sum_{i=1}^{n} a_i} \right\rfloor,$$

wherein $a_i$ for i=1, 2, . . . n and $w_i$ for i=1, 2, . . . n comprise the set of updated parameters, b[k] represents a k-th bin of a bin stream, $q_i[k+1]$ for i=1, 2, . . . n comprise intermediate probability estimates for the (k+1)-th bin of the bin stream, and p[k+1]) comprises the second probability estimation;
        debinarizing the second bin stream to form the second decoded syntax element; and
    reconstructing a picture of the video data based in part on the first decoded syntax element and the second decoded syntax element.

2. The method of claim 1, wherein determining the second probability estimation for the at least one bin of the second bin stream based on the set of updated parameters comprises determining the set of updated parameters in response to a measure of progression exceeding a threshold.

3. The method of claim 2, wherein the measure of progression comprises a number of previously decoded bins, the method further comprising:
    using the set of updated parameters to determine the second probability estimation for the at least one bin of the second bin stream in response to the measure of progression exceeding a threshold and in response to the second decoded syntax element corresponding a new block of video data.

4. The method of claim 2, wherein the measure of progression comprises a position of a block.

5. The method of claim 2, wherein the measure of progression comprises a number of previously decoded pixels.

6. The method of claim 1, further comprising:
determining a third decoded syntax element by applying the binary arithmetic decoding to an encoded version of the third syntax element included in the bitstream of the video data, wherein applying the binary arithmetic decoding to the encoded version of the third syntax element comprises:
generating a third bin stream, wherein generating the third bin stream comprises, for at least one bin of the third bin stream, determining a third probability estimation for the at least one bin of the third bin stream based on a third set of parameters, wherein the third set of parameters comprises different parameters than the set of initial parameters and the set of updated parameters;
debinarizing the third bin stream to form the third decoded syntax element; and
reconstructing the picture of the video data based in part on the first decoded syntax element, the second decoded syntax element, and the third decoded syntax element.

7. A non-transitory computer readable medium storing instructions that when executed by one or more processors cause the one or more processors to:
determine a first decoded syntax element by applying binary arithmetic decoding to an encoded version of the first syntax element included in a bitstream of the video data, wherein to apply the binary arithmetic decoding to the encoded version of the first syntax element, the instructions cause the one or more processors to:
generate a first bin stream, wherein to generate the first bin stream, the instructions cause the one or more processors to determine a first probability estimation for at least one bin of the first bin stream based on a set of initial parameters;
debinarize the first bin stream to form the first decoded syntax element;
determine a second decoded syntax element by applying the binary arithmetic decoding to an encoded version of the second syntax element included in the bitstream of the video data, wherein to apply the binary arithmetic decoding to the encoded version of the second syntax element, the instructions cause the one or more processors to:
generate a second bin stream, wherein to generate the second bin stream, the instructions cause the one or more processors to determine a second probability estimation for the at least one bin of the second bin stream based on a set of updated parameters, wherein the set of updated parameters comprises different parameters than the set of initial parameters, wherein to determine the second probability estimation for the at least one bin of the second bin stream based on the set of updated parameters, the instructions cause the one or more processors to determine the second probability estimation according to the equations:

$$q_i[k+1] = q_i[k] + \left\lfloor \frac{2^{15}b[k] - q_i[k]}{w_i} \right\rfloor \text{ for } i = 1, 2, \ldots n,$$

$$p[k+1] = \left\lfloor \frac{a_1 * q_1[k+1] + a_2 * q_2[k+1] + \ldots + a_n * q_n[k+1]}{\sum_{i=1}^{n} a_i} \right\rfloor,$$

wherein $a_i$ for $i=1, 2, \ldots n$ and $w_i$ for $i=1, 2, \ldots n$ comprises the set of updated parameters, $b[k]$ represents a k-th bin of a bin stream, $q_i[k+1]$ for $i=1, 2, \ldots n$ comprise intermediate probability estimates for the (k+1)-th bin of the bin stream, and $p[k+1])$ comprises the second probability estimation,
debinarize the second bin stream to form the second decoded syntax element; and
reconstruct a picture of the video data based in part on the first decoded syntax element and the second decoded syntax element.

8. The computer readable storage medium of claim 7, wherein to determine the second probability estimation for the at least one bin of the second bin stream based on the set of updated parameters, the instructions cause the one or more processors to determine the set of updated parameters in response to a measure of progression exceeding a threshold.

9. The non-transitory computer readable storage medium of claim 8, wherein the measure of progression comprises a number of previously decoded bins, wherein the instructions cause the one or more processors to:
use the set of updated parameters to determine the second probability estimation for the at least one bin of the second bin stream in response to the measure of progression exceeding a threshold and in response to the second decoded syntax element corresponding a new block of video data.

10. The non-transitory computer readable storage medium of claim 8, wherein the measure of progression comprises a position of a block.

11. The non-transitory computer readable storage medium of claim 8, wherein the measure of progression comprises a number of previously decoded pixels.

12. The non-transitory computer readable storage medium of claim 7, wherein the instructions cause the one or more processors to
determine a third decoded syntax element by applying the binary arithmetic decoding to an encoded version of the third syntax element included in the bitstream of the video data, wherein to apply the binary arithmetic decoding to the encoded version of the third syntax element, the instructions cause the one or more processors to:
generate a third bin stream, wherein generating the third bin stream comprises, for at least one bin of the third bin stream, determining a third probability estimation for the at least one bin of the third bin stream based on a third set of parameters, wherein the third set of parameters comprises different parameters than the set of initial parameters and the set of updated parameters;
debinarize the third bin stream to form the third decoded syntax element; and
reconstruct the picture of the video data based in part on the first decoded syntax element, the second decoded syntax element, and the third decoded syntax element.

13. A device for decoding video data, the device comprising:
a memory configured to store a bitstream of video data;
one or more processors in communication with the memory and implemented in processing circuitry, wherein the one or more processors are configured to:
determine a first decoded syntax element by applying binary arithmetic decoding to an encoded version of the first syntax element included in a bitstream of the video data, wherein to apply the binary arithmetic decoding to the encoded version of the first syntax element, the one or more processors are further configured to:
  generate a first bin stream by determining a first probability estimation for at least one bin of the first bin stream based on a first set of initial parameters;
  debinarize the first bin stream to form the first decoded syntax element;
determine a second decoded syntax element by applying the binary arithmetic decoding to an encoded version of the second syntax element included in the bitstream of the video data, wherein to apply the binary arithmetic decoding to the encoded version of the second syntax element, the one or more processors are further configured to:
  generate a second bin stream by determining a second probability estimation for at least one bin of the second bin stream based on a set of updated parameters, wherein the set of updated parameters comprises different parameters than the first set of initial parameters, wherein determining the second probability estimation for the at least one bin of the second bin stream based on the set of updated parameters comprises determining the second probability estimation according to the equations:

$$q_i[k+1] = q_i[k] + \left\lfloor \frac{2^{15} b[k] - q_i[k]}{w_i} \right\rfloor \text{ for } i = 1, 2, \ldots n,$$

$$p[k+1] = \left\lfloor \frac{a_1 * q_1[k+1] + a_2 * q_2[k+1] + \ldots + a_n * q_n[k+1]}{\sum_{i=1}^{n} a_i} \right\rfloor,$$

wherein $a_i$ for i=1, 2, ... n and $w_i$ for i=1, 2, ... n comprises the second set of updated parameters, b[k] represents a k-th bin of a bin stream, $q_i[k+1]$ for i=1, 2, ... n comprise intermediate probability estimates for the (k+1)-th bin of the bin stream, and p[k+1]) comprises the second probability estimation;
  debinarize the second bin stream to form the second decoded syntax element; and reconstruct a picture of the video data based in part on the first decoded syntax element and the second decoded syntax element.

14. The device of claim 13, wherein to determine the second probability estimation for the at least one bin of the second bin stream based on the set of updated parameters, the one or more processors are further configured to determine the set of updated parameters in response to a measure of progression exceeding a threshold.

15. The device of claim 14, wherein the measure of progression comprises a number of previously decoded bins, and wherein the one or more processors are further configured to:
  use the set of updated parameters to determine the second probability estimation for the at least one bin of the second bin stream in response to the measure of progression exceeding a threshold and in response to the second decoded syntax element corresponding a new block of video data.

16. The device of claim 14, wherein the measure of progression comprises a position of a block.

17. The device of claim 14, wherein the measure of progression comprises a number of previously decoded pixels.

18. The device of claim 14, wherein the one or more processors are further configured to:
  determine a third decoded syntax element by applying the binary arithmetic decoding to an encoded version of the third syntax element included in the bitstream of the video data, wherein to apply the binary arithmetic decoding to the encoded version of the third syntax element, the one or more processors are further configured to:
    generate a third bin stream, wherein generating the third bin stream comprises, for at least one bin of the third bin stream, determining a third probability estimation for the at least one bin of the third bin stream based on a third set of parameters, wherein the third set of parameters comprises different parameters than the initial set of parameters and the set of updated parameters;
    debinarize the third bin stream to form the third decoded syntax element; and
  reconstruct the picture of the video data based in part on the first decoded syntax element, the second decoded syntax element, and the third decoded syntax element.

* * * * *